US012769455B2

(12) United States Patent
Cai

(10) Patent No.: US 12,769,455 B2
(45) Date of Patent: Oct. 20, 2026

(54) CONFIGURABLE MEMORY PROVISIONING

(71) Applicant: Apple Inc., Cupertino, CA (US)

(72) Inventor: Qiong Cai, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/954,100

(22) Filed: Nov. 20, 2024

(65) Prior Publication Data

US 2026/0086724 A1 Mar. 26, 2026

Related U.S. Application Data

(60) Provisional application No. 63/699,434, filed on Sep. 26, 2024.

(51) Int. Cl.
*G06F 3/06* (2006.01)

(52) U.S. Cl.
CPC .......... *G06F 3/0619* (2013.01); *G06F 3/0659* (2013.01); *G06F 3/0673* (2013.01)

(58) Field of Classification Search
CPC ..... G06F 3/0619; G06F 3/0659; G06F 3/0673
See application file for complete search history.

(56) References Cited

U.S. PATENT DOCUMENTS 6,199,177 B1 3/2001 Blodgett
7,984,329 B2 7/2011 Lastras-Montano et al.
8,868,829 B2 10/2014 Rajan et al.
9,037,928 B2 5/2015 Kleveland et al.
9,239,355 B1 1/2016 Burstein et al.
11,200,176 B2 12/2021 Ramanujan et al.
2004/0237001 A1 11/2004 Schulz et al.
2013/0036270 A1 2/2013 Dreslinski et al.
2013/0159587 A1* 6/2013 Nygren .................. G11C 5/063
710/306

(Continued)

FOREIGN PATENT DOCUMENTS

CN 112652341 B 12/2023
JP 2002184176 A 6/2002

(Continued)

OTHER PUBLICATIONS

International Search Report and Written Opinion in PCT Appl. No. PCT/US2025/046555 mailed Jan. 16, 2026, 11 pages.

*Primary Examiner* — Nicholas A. Paperno
(74) *Attorney, Agent, or Firm* — Kowert, Hood, Munyon, Rankin & Goetzel, P.C.; Scott W. Pape; Dean M. Munyon

(57) ABSTRACT

Provisioning portions of a memory subsystem of a computer system that has at least a first dimension and a second dimension, such that those portions are not used during normal operation. The apparatus includes a memory interface circuit having provisioning circuits performing different provisioning operations. The memory interface circuit is configured to receive a physical memory address, and output, based on provisioning information indicating a first provisioning operation, a first set of selection signals that are usable to access some, but not all, elements in the first dimension. The first provisioning operation may include an operation of the form ((y mod (C−1))+z) mod C, where C is a total number of elements in the first dimension, y is a relevant portion of the physical memory address, and z is an offset value indicating which elements in the first dimension are to be unused.

20 Claims, 23 Drawing Sheets

Memory channel
135A defective

(56) References Cited

U.S. PATENT DOCUMENTS

| | | | |
|---|---|---|---|
| 2016/0019139 A1 | 1/2016 | Alam et al. | |
| 2016/0342545 A1 | 11/2016 | Arai et al. | |
| 2018/0024966 A1 | 1/2018 | Eilert et al. | |
| 2019/0012099 A1* | 1/2019 | Mulani | G06F 3/0619 |
| 2019/0205244 A1* | 7/2019 | Smith | G06F 3/065 |
| 2021/0056039 A1 | 2/2021 | Ramesh | |
| 2021/0149570 A1 | 5/2021 | Burchardt et al. | |
| 2022/0238174 A1* | 7/2022 | Schaefer | G11C 29/4401 |
| 2023/0305725 A1 | 9/2023 | Mienkina et al. | |

FOREIGN PATENT DOCUMENTS

| | | |
|---|---|---|
| KR | 101964454 B1 | 4/2019 |
| KR | 102076416 B1 | 3/2020 |

* cited by examiner

400

Example with no defective memory:
8 memory controllers
1 channel per controller
2 rows / channel

410

| | 3 | 2 | 1 | 0 |
|---|---|---|---|---|
| $\sigma_1$ | 0 | 0 | 0 | 1 |
| $\sigma_2$ | 0 | 1 | 1 | 0 |
| $\sigma_3$ | 0 | 1 | 0 | 0 |
| $M_r$ | 1 | 0 | 0 | 0 |

$a=[H(x,\sigma_3), H(x, \sigma_2), H(x, \sigma_1)]$ 412

$r=\text{extraction}(x, M_r)$ 416

420

| Value | Bit vector | a | r |
|---|---|---|---|
| 0 | 0000 | [0, 0, 0] = 0 | 0 |
| 1 | 0001 | [0, 0, 1] = 1 | 0 |
| 2 | 0010 | [0, 1, 0] = 2 | 0 |
| 3 | 0011 | [0, 1, 1] = 3 | 0 |
| 4 | 0100 | [1, 0, 0] = 4 | 0 |
| 5 | 0101 | [1, 1, 1] = 7 | 0 |
| 6 | 0110 | [1, 1, 0] = 6 | 0 |
| 7 | 0111 | [1, 0, 1] = 5 | 0 |
| 8 | 1000 | [0, 0, 0] = 0 | 1 |
| 9 | 1001 | [0, 0, 1] = 1 | 1 |
| 10 | 1010 | [0, 1, 0] = 2 | 1 |
| 11 | 1011 | [0, 1, 1] = 3 | 1 |
| 12 | 1100 | [1, 0, 0] = 4 | 1 |
| 13 | 1101 | [1, 1, 1] = 7 | 1 |
| 14 | 1110 | [1, 1, 0] = 6 | 1 |
| 15 | 1111 | [1, 0, 1] = 5 | 1 |

FIG. 4

Provisioning type 1:
Removing one memory controller

500C

500D

| z | Available memory controllers | Memory controller removed |
|---|---|---|
| 0 | 0-6 | 7 |
| 2 | 0, 2-7 | 1 |
| 3 | 0-1, 3-7 | 2 |
| 4 | 0-2, 4-7 | 3 |
| 5 | 0-3, 5-7 | 4 |
| 6 | 0-4, 6-7 | 5 |
| 7 | 0-5, 7 | 6 |

501

Example: 8 memory controllers (0-7) (a)
1 memory channel / controller
2 rows per memory channel (r)
Remove memory controller 4 (z=5),
leaving 14 physical addresses

502A $a = (((x \text{ and } \sigma_2) \bmod 7) + 5) \bmod 8$ $r = \text{extraction}(x, M_r) \text{ div } 7$

502B

503

| | 3 | 2 | 1 | 0 |
|---|---|---|---|---|
| $\sigma_2$ | 1 | 1 | 1 | 1 |
| $M_r$ | 1 | 1 | 1 | 1 |

504

| Value | Bit vector | a | r |
|---|---|---|---|
| 0 | 0000 | 5 | 0 |
| 1 | 0001 | 6 | 0 |
| 2 | 0010 | 7 | 0 |
| 3 | 0011 | 0 | 0 |
| 4 | 0100 | 1 | 0 |
| 5 | 0101 | 2 | 0 |
| 6 | 0110 | 3 | 0 |
| 7 | 0111 | 5 | 1 |
| 8 | 1000 | 6 | 1 |
| 9 | 1001 | 7 | 1 |
| 10 | 1010 | 0 | 1 |
| 11 | 1011 | 1 | 1 |
| 12 | 1100 | 2 | 1 |
| 13 | 1101 | 3 | 1 |

FIG. 5B

| z | Available memory controllers | Memory controllers removed |
|---|---|---|
| 0 | {0, 1, 2, 3, 4, 5} | {6, 7} |
| 2 | {4, 5, 6, 7, 0, 1} | {2, 3} |
| 3 | {6, 7, 0, 1, 2, 3} | {4, 5} |

Example: 8 memory controllers (0-7) (a ) 601
1 channel per memory controller
2 rows per channel
Remove memory controllers 4 and 5 (z=3),
leaving 12 physical addresses $a = [H(x, \sigma_1)] + ((((x \text{ and } \sigma_2) \bmod 3) + 3) \bmod 4) * 2$ 602A $r = \text{extraction}(x, M_r) \text{ div } 3$ 602B

603

| | 3 | 2 | 1 | 0 |
|---|---|---|---|---|
| $\sigma_1$ | 0 | 0 | 0 | 1 |
| $\sigma_2$ | 1 | 1 | 1 | 0 |
| $M_r$ | 1 | 1 | 1 | 0 |

604

| Value | Bit vector | a | r |
|---|---|---|---|
| 0 | 0000 | 6 | ((000)=0) div3=0 |
| 1 | 0001 | 7 | ((000)=0) div3=0 |
| 2 | 0010 | 2 | ((001)=1) div3=0 |
| 3 | 0011 | 3 | ((001)=1) div3=0 |
| 4 | 0100 | 0 | ((010)=2) div3=0 |
| 5 | 0101 | 1 | ((010)=2) div3=0 |
| 6 | 0110 | 6 | ((011)=3) div3=0 |
| 7 | 0111 | 7 | ((011)=3) div3=0 |
| 8 | 1000 | 2 | ((100)=4) div3=0 |
| 9 | 1001 | 3 | ((100)=4) div3=0 |
| 10 | 1010 | 0 | ((101)=5) div3=0 |
| 11 | 1011 | 1 | ((101)=5) div3=0 |

FIG. 6B

701

Example: 8 memory controllers (0-7) (a )
4 channels per memory controller (Local 0-3 (p); Global 0-31 (d))
2 rows per channel (0-1) (r)
Remove global memory channel 9 (z=10),
leaving 62 physical addresses $d = (((x \text{ and } \sigma_2) \bmod 31) + 10) \bmod 32$ ← 702A
702B → $a = d \text{ div } 4$ ← 702B
702C → $p = d \bmod 4$ ← 702C
$r = \text{extraction}(x, M_r) \text{ div } 31$ ← 702D

703

| | 5 | 4 | 3 | 2 | 1 | 0 |
|---|---|---|---|---|---|---|
| $\sigma_2$ | 1 | 1 | 1 | 1 | 1 | 1 |
| $M_r$ | 1 | 1 | 1 | 1 | 1 | 1 |

704

| | Value |
|---|---|
| Decimal | 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61 |
| d | 10, 11, 12, 13, 14, 15, 16, 17, 18, 19, 20, 21, 22, 23, 24, 25, 26, 27, 28, 29, 30, 31, 0, 1, 2, 3, 4, 5, 6, 7, 8, 10, 11, 12, 13, 14, 15, 16, 17, 18, 19, 20, 21, 22, 23, 24, 25, 26, 27, 28, 29, 30, 31, 0,1, 2, 3, 4, 5, 6, 7, 8 |
| a | 2, 2, 3, 3, 3, 3, 4, 4, 4, 4, 5, 5, 5, 5, 6, 6, 6, 6, 7, 7, 7, 7, 0, 0, 0, 0, 1, 1, 1, 1, 2, 2, 2, 3, 3, 3, 3, 4, 4, 4, 4, 5, 5, 5, 5, 6, 6, 6, 6, 7, 7, 7, 7, 0, 0, 0, 0, 1, 1, 1, 1, 2 |
| p | 2, 3, 0, 1, 2, 3, 0, 1, 2, 3, 0, 1, 2, 3, 0, 1, 2, 3, 0, 1, 2, 3, 0, 1, 2, 3, 0, 1, 2, 3, 0, 2, 3, 0, 1, 2, 3, 0, 1, 2, 3, 0, 1, 2, 3, 0, 1, 2, 3, 0, 1, 2, 3, 0, 1, 2, 3, 0, 1, 2, 3, 0 |
| $r$ | 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1 |

FIG. 7B

801

Example: 8 memory controllers (0-7) (a )
4 channels per memory controller — Local (0-3) (p); Global (0-31) (d)
2 rows per channel (r)
Remove memory channels 30 & 31 (z=0),
leaving 60 physical addresses 802A: $d = H(x, \sigma_1) + ((((x \text{ and } \sigma_2) \bmod 15) + 0) \bmod 16) \times 2$ 802B: $a = d \text{ div } 4$ 802C: $p = d \bmod 4$ 802D: $r = \text{extraction}(x, M_r) \text{ div } 15$

803

| | 5 | 4 | 3 | 2 | 1 | 0 |
|---|---|---|---|---|---|---|
| $\sigma_1$ | 0 | 0 | 0 | 0 | 0 | 1 |
| $\sigma_2$ | 1 | 1 | 1 | 1 | 1 | 0 |
| $M_r$ | 1 | 1 | 1 | 1 | 1 | 0 |

FIG. 8B

CONFIGURABLE MEMORY PROVISIONING

PRIORITY CLAIM

The present application claims priority to U.S. Provisional Application No. 63/699,434, entitled "Configurable Memory Provisioning," filed Sep. 26, 2024, the disclosure of which is incorporated by reference herein in its entirety.

BACKGROUND

Technical Field

This application relates generally to computer systems, and more specifically to selectively disabling portions of memory subsystems of such computer systems.

Description of the Related Art

Dynamic Random Access Memory (DRAM), also known as system memory, is an integral part of modern computer systems. DRAM provides temporary data storage, enabling quick access to information for processing tasks. DRAM is thus volatile memory, as opposed to non-volatile memory that retains information even when a computer system does not have power.

BRIEF DESCRIPTION OF THE DRAWINGS

FIG. 4 illustrates an example of memory routing that is performed by a memory interface circuit when no portions of memory are disabled.

FIGS. 5A-C illustrate memory routing that may be performed by a memory interface circuit when a single memory controller is disabled.

FIGS. 6A-C illustrate memory routing that may be performed by a memory interface circuit when a pair of memory controllers is disabled.

FIGS. 7A-C illustrate memory routing that may be performed by a memory interface circuit when a single memory channel is disabled.

FIGS. 8A-C illustrate memory routing that may be performed by a memory interface circuit when a pair of memory channels is disabled.

DETAILED DESCRIPTION

Figure 1A:
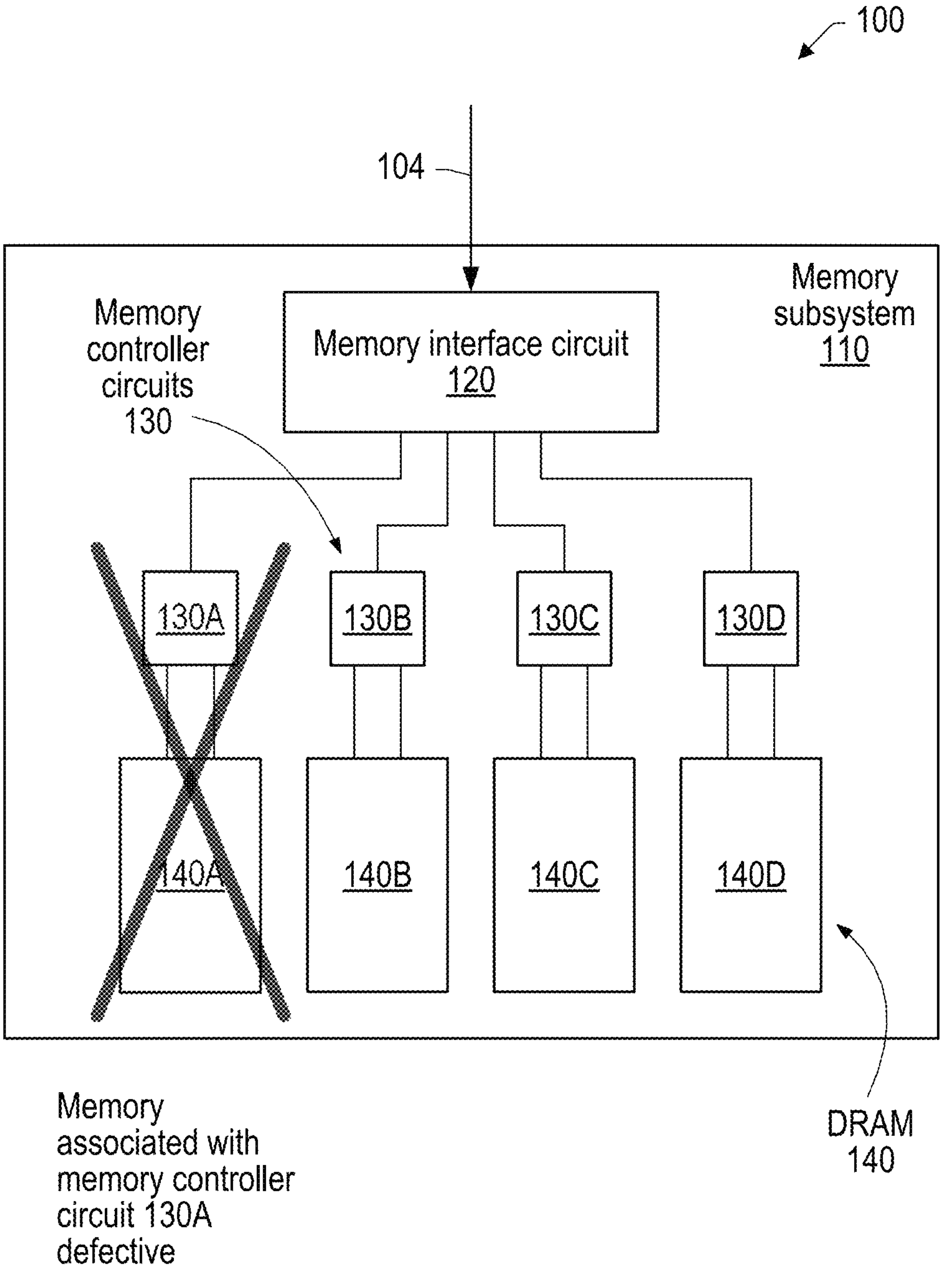
FIGS. 1A-B are block diagrams depicting different instances of defective memory portions within a computer system.

The type and amount of DRAM included in a computer system can greatly influence the performance of the computer system, since DRAM is one of the primary components responsible for data storage and access speed. But the cost of DRAM also has a significant bearing on the overall cost of a computer system. In some cases, the cost of DRAM can also fluctuate wildly based on current market forces.

Given the importance of DRAM to system performance and cost, memory manufacturers have sought to maximize DRAM yield and reliability. But there are different types of DRAM performance issues that can arise at various stages of the production process, from the fabrication of DRAM semiconductor chips to the assembly of memory modules as components in computer systems. Common manufacturing defects include stuck bits, leakage currents, timing errors, physical damage from manufacturing and handling processes such as cracks or scratches, and contamination by foreign particles such as dust or chemical residues. Variations in production environments such as temperature and humidity can also impact the characteristics of the chips being produced, resulting in defects that may not be immediately apparent during testing.

DRAM manufacturers implement rigorous quality control measures, including testing and screening, to identify and mitigate these defects before the DRAM reaches its customers. But despite these efforts, some defective units can still make it to market. One solution to help ensure data integrity is the use of error-correcting code (ECC) when accessing DRAM. ECC memory uses additional bits to store error correction codes alongside the actual data. When data is read from memory, the ECC algorithm checks for any discrepancies between the stored data and the expected data, allowing the system to identify and correct single-bit errors automatically. In the event of a multi-bit error, ECC can typically detect the issue but may not be able to correct it, thereby alerting the system to potential problems that could jeopardize data integrity.

Technology companies that incorporate DRAM into computer systems are often faced with scenarios in which DRAM that has been cleared as functional by DRAM manufacturers may fail functional testing during system testing. Such failures may be due to latent issues or handling during the computer assembly process. Still further, technologies such as ECC are inherently limited in the scope of errors that can be corrected.

Computer system manufacturers may thus be faced with a scenario in which a fully assembled computer system, which may consist of one or more integrated circuits co-packaged with one or more DRAM memory modules in some implementations, has one or more defective portions of memory that ECC cannot remediate. One (expensive) solution is simply to discard the failing parts entirely; another solution is to attempt to unpackage the failing DRAM and repackage the system with functional DRAM. The present inventor has realized that both solutions are unsatisfactory, and recognizes the desirability of routing, during normal operation, memory accesses away from DRAM determined to be defective during the manufacturing process. "Normal operation" refers to use of the computer system for its intended customer, and not operations that might occur during manufacturing testing or testing that might occur in other scenarios such as system boot-up.

The present inventor thus proposes a paradigm in which provisioning information can be stored within a computer system, the provisioning information indicating which portions of memory are determined to be defective. The paradigm further contemplates a memory interface circuit configured to use this provisioning information to ensure that, during normal operation, no memory accesses are routed to those portions of the memory determined to be defective. As used herein, "provisioning" of memory refers to the act of routing memory access requests away from portions, or elements, of the memory that are determined to be defective.

This provisioning occurs as a request enters the memory subsystem, and thus provisioning does not refer to routing actions that might occur within a DRAM IC. Note that the provisioning is transparent to the entity making a memory access request, since the provisioning can be configured to be handled entirely within the memory subsystem. Accordingly, a requesting entity need not know that portions of the memory subsystem are defective.

Consider computer system 100 depicted in FIG. 1A. As illustrated, computer system 100 includes a memory subsystem 110, which is configured to receive a memory access request 104. Memory access request 104 may be a read access, a write access, or a combination thereof, and may include a physical memory address of one or more physical locations within memory subsystem 110. (A physical memory address stands in contrast to a "virtual memory address" that refers to a virtual memory location in a virtual memory space that is typically larger than a physical memory space to which a physical memory address is directed.) The memory locations corresponding to request 104 are thus physically located within DRAM 140. To access the appropriate DRAM memory locations, a particular set of selection signals are caused to be activated or asserted by memory interface circuit 120 in response to receiving request 104.

Memory subsystem 110 can be organized into a hierarchy with different memory "dimensions." As used herein, a memory dimension refers to a level of the hierarchy that is used to route a memory access request. Examples of memory dimensions include, but are not limited to, a memory controller dimension, a memory channel dimension, a bank group dimension, a bank dimension, a row dimension, and a column dimension. Whatever levels a given memory subsystem has, routing or selection signals can be generated for each level/dimension from a given physical memory address.

The present disclosure refers to provisioning an element or elements of dimensions of a computer memory subsystem. As used herein, an "element" of a dimension refers to a component of that dimension that is being provisioned. For example, if the dimension in question is the row dimension, then elements of that dimensions may be considered rows. In some cases, an element may refer to a single component of a dimension (e.g., an element may be a single memory controller when a single memory controller circuit is being provisioned) or multiple components (e.g., an element may be a pair of memory controllers when a pair of memory controller circuits are being provisioned). Provisioning of a memory dimension that causes some, but not all, of the elements in the memory dimension to be accessible by memory access requests. In other words, only a subset (defined herein to refer to a proper subset) of the elements in that dimension are accessible.

FIG. 1A illustrates the memory controller dimension. As shown, DRAM 140 (which can be generalized as volatile memory or system memory) may be composed of multiple DRAM integrated circuits (ICs) or multiple memory modules, each of which includes one or more DRAM ICs. In FIG. 1A, DRAM 140 is composed of four different memory modules 140A-D, although that number is only an example. In the illustrated embodiment, each DRAM module 140 is coupled to a different memory controller circuit 130, as indicated by reference numerals 130A-D.

Consider a scenario in which DRAM 140A, which is associated with memory controller circuit 130A, is sufficiently defective that its errors cannot be corrected (e.g., using ECC). Under this scenario, computer system 100 either may need to be scrapped or disassembled and reassembled with different memory. Under another scenario (not pictured), DRAM 140B associated with memory controller circuit 130B might also be defective.

Figure 1B:
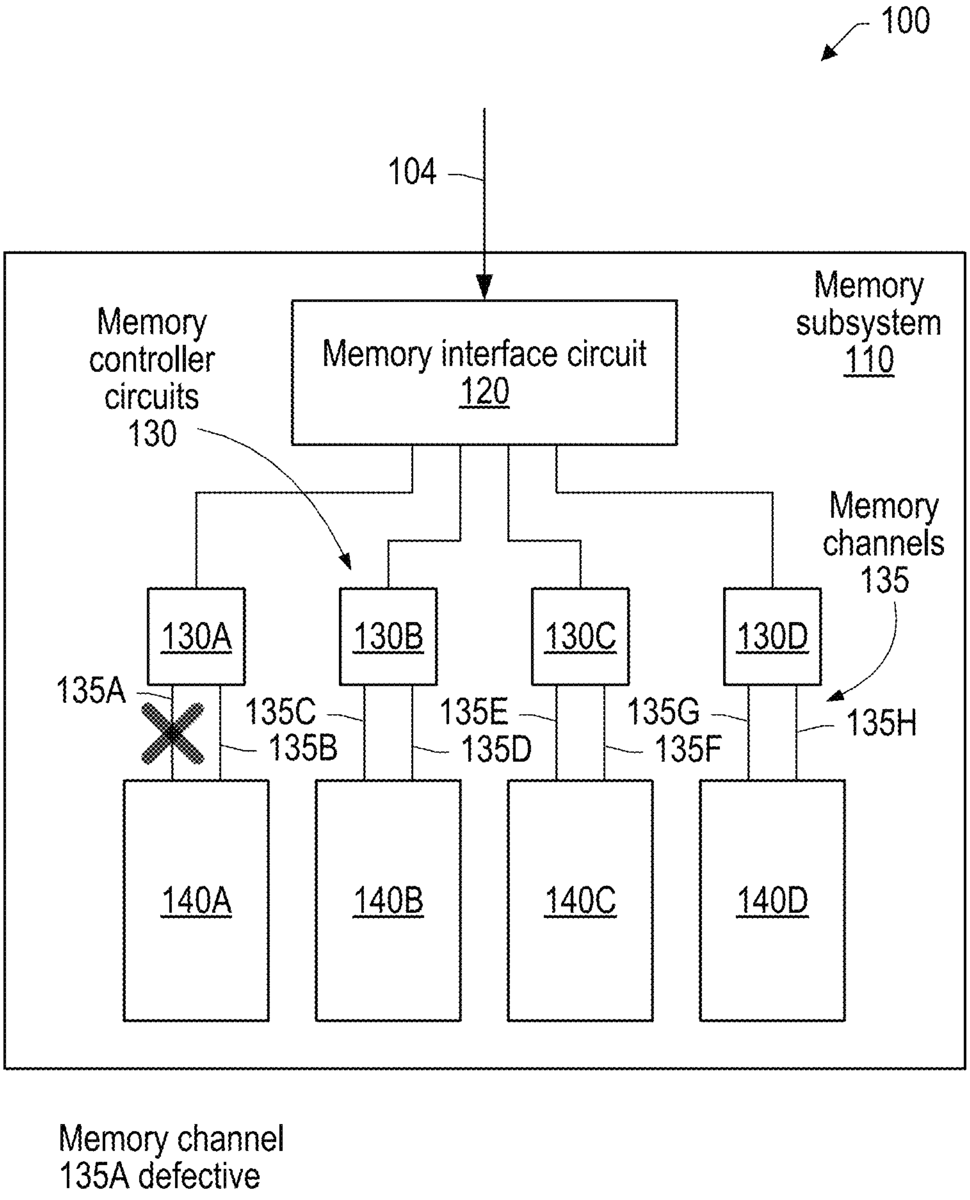

FIG. 1B illustrates a related scenario for a different memory dimension, with reference to computer system 100 having similarly numbered components. Computer system 100 pictured in FIG. 1B illustrates the memory channel dimension. As shown, a given memory controller circuit 130 may be able to send out one or more different sets of physical memory addresses, often in parallel. For example, each memory controller circuit 130 in FIG. 1B has two memory channels. Memory controller circuit 130A has memory channels 135A-B, and collectively, memory controller circuits 130 can address eight memory channels, 135A-H.

As shown in FIG. 1B, memory associated with memory channel 135A has been determined to be defective (e.g., by system testing during manufacturing or boot diagnostics). This is a different scenario than that depicted in FIG. 1A. In FIG. 1B, half of the memory associated with DRAM 140A is usable, as compared to FIG. 1A, in which all of DRAM 140A is deemed unusable. In a related scenario, multiple memory channels may have defective memory (e.g., 2 out of 4 memory channels for a particular memory controller circuit may be defective).

The present inventor has realized that scenarios such as those illustrated in FIGS. 1A-B can be handled by implementing a set of provisioning circuits. As will be described, the function of such circuits is to cause a memory access request 104 to be routed away from memory controller circuit(s) or memory channel(s) determined to be defective. A particular provisioning circuit can be enabled based on, for example, provisioning information that is hard coded in computer system (e.g., encoded in nonvolatile storage within computer system 100.) In some embodiments, a selected provisioning circuit will be active for a lifetime of the computer system. In this manner, computer system 100 need not be discarded or disassembled if a portion of DRAM 140 is determined to be defective.

Figure 1C:
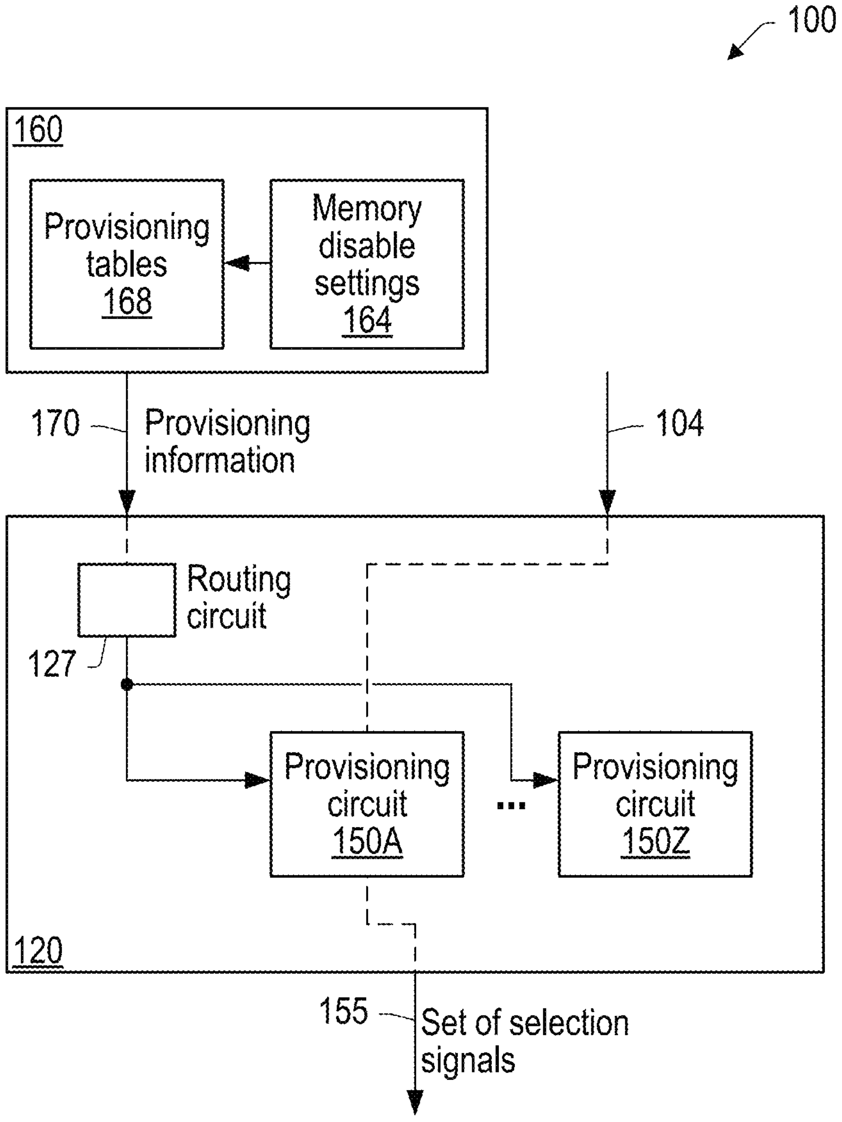
FIG. 1C is a block diagram of a memory interface circuit with a set of provisioning circuits for disabling portions of a memory subsystem.

This paradigm is illustrated in FIG. 1C, which is a block diagram of one embodiment of a computer system with a set of provisioning circuits. As depicted, computer system 100 includes provisioning storage 160 and memory interface circuit 120. At a high level, memory interface circuit 120 is configured, in response to receiving memory access request 104 and provisioning information 170, to output a set of selection signals 155 to various dimensions of memory subsystem 110 in order to fulfill memory access request 104.

Provisioning storage 160 stores disable information that indicates the nature of provisioning that is to be performed by memory interface circuit 120. Accordingly, if defective memory is discovered during functional testing of computer system 100, disable information may be stored in provisioning storage 160 that indicates which dimension is defective and which elements of that dimension are defective. In many cases, provisioning storage is nonvolatile memory, with disable information being encoded, for example, in a set of fuses that may be blown, or programmed in a read-only memory.

In the depicted embodiment, provisioning storage 160 includes memory disable settings 164 and provisioning tables 168. As will be described, memory disable settings 164 may indicate the type of provisioning to be performed (e.g., disable a single memory controller), as well as the element or elements in the indicated dimension that are not to be used. In some cases, data in memory disable settings 164 is used to index into provisioning tables 168, which are used to translate information in memory disable settings 164 into provisioning information 170 usable by memory interface circuit 120. Note that in some instances, provisioning storage 160 will indicate that no memory provisioning is to take place because all memory is deemed sufficiently operational (e.g., there are no defective portions or defects can be handled by ECC).

As depicted, memory interface circuit 120 includes, in one embodiment, routing circuit 127 and a set of provisioning circuits 150, indicated in FIG. 1C by reference numerals 150A-Z. As will be described, each of provisioning circuits 150 may be configured to perform a different type of provisioning operation. For example, a first one of provisioning circuits 150 may be configured to disable a single memory controller, while a second of provisioning circuits 150 may be configured to disable a pair of memory controllers. (The "disabling" happens because no accesses are routed to the defective portions.) Provisioning information 170 may include information indicating which of provisioning circuits 150 is to be utilized during operation. If no memory defects are indicated by provisioning information 170, standard routing circuitry within memory interface circuit 120 (not pictured) will be used to handle memory access requests 104; provisioning circuits 150 are not used in such scenarios.

In some embodiments in which memory disable settings 164 are hard coded, the particular provisioning circuit 150 that is indicated will be the only provisioning circuit 150 that is utilized for routing memory access requests 104 for the life cycle of computer system 100. In other words, memory interface circuit 120 includes a number of different provisioning circuits 150 to accommodate all contemplated types of provisioning, but in some cases, only a single one of those provisioning circuits 150 is ever utilized for a particular instance of computer system 100 once the actual nature of memory defects is determined. Accordingly, routing circuit 127 may be used to enable only the selected provisioning circuit 150 and to disable all remaining provisioning circuits 150.

In other embodiments, computer system 100 may perform a functional memory test upon each boot of the system, and store any memory disable information in memory disable settings 164. In these embodiments, the selected provisioning circuit 150 may vary between different boots of the system. Routing circuit 127 will similarly ensure that only the provisioning circuit 150 selected by provisioning information 170 will be active while computer system 100 is operational.

Additionally, provisioning information 170 may be used to indicate which elements a selected provisioning circuit is to exclude. Accordingly, one portion of provisioning information 170 may be used to select a provisioning circuit, while another portion may be used to instruct the selected provisioning circuit 150 which elements to exclude.

The output of the selected provisioning circuit is a set of selection signals for at least the dimension being provisioned. For example, consider a scenario in which there are 8 memory controllers and memory controller 6 is defective and thus should not be used. Selection signals 155 will thus have the decimal values 0-5 and 7 (binary values 000, 001, 010, 011, 100, 101, and 111). Other selection signals, such as those for non-provisioned dimensions, may be generated by standard routing circuitry that is not pictured.

Figure 2A:
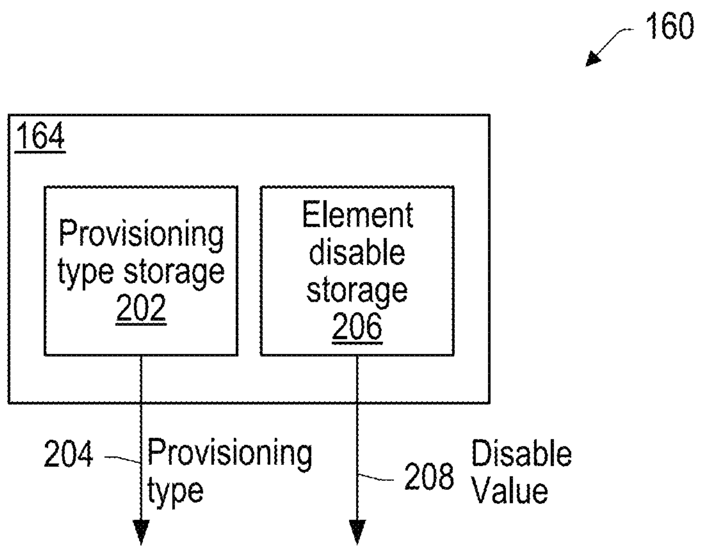
FIG. 2A is a block diagram of one embodiment of circuitry for storing indications of what memory elements are to be disabled.

FIG. 2A is a block diagram of one embodiment of memory disable settings 164 within provisioning storage 160. In the depicted embodiment, memory disable settings 164 includes two forms of information. First, settings 164 includes provisioning type storage 202, which is configured to output, in one embodiment, provisioning type 204, which indicates which (if any) type of memory provisioning is to be performed by memory interface circuit 120. In one implementation, each provisioning circuit 150 performs a different type of provisioning operation. As will be described below, different "types" of provisioning include provisioning of different memory dimensions and provisioning of different number of elements within a given memory dimension. Thus, in one implementation, provisioning of memory controller circuits is a different type of provisioning than provisioning of memory channels. Similarly, removing a single memory controller may be a different type of provisioning than removing a pair of memory controllers. Generally speaking, a given type of provisioning operation has its own dedicated circuitry; provisioning type 204 is thus usable to select a particular one of provisioning circuits 150.

Second, memory disable settings 164 may include element disable storage 206. Whereas provisioning type 204 indicates a particular provisioning circuit 150 (and thus a particular provisioning operation or type), element disable storage 206 is configured to store information indicating what element or elements are the selected provisioning circuit 150 should not utilize. When accessed, element disable storage 206 is configured to output disable value 208. For example, if provisioning type 204 indicates that a pair of memory controller circuits are not to be used, disable value 208 might be used to indicate which pair of memory controller circuits are not to be used (e.g., controllers 4 and 5).

Figure 2B:
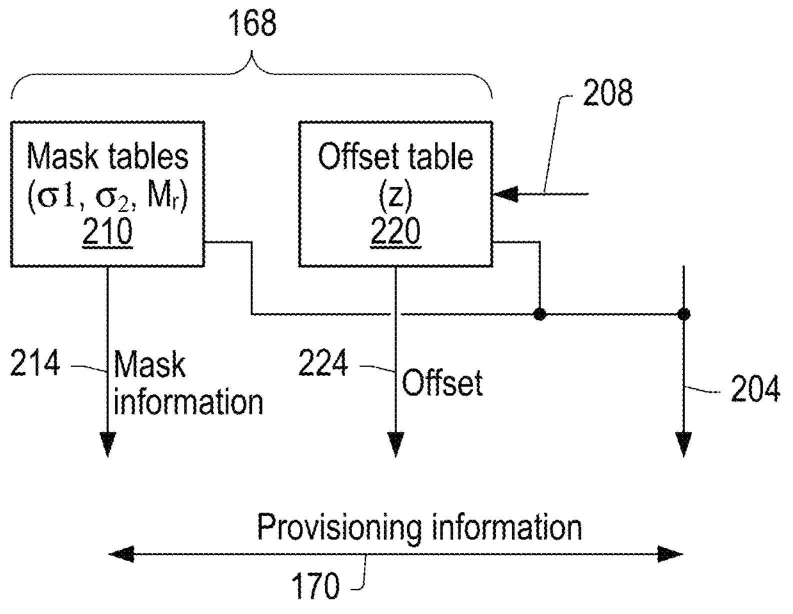
FIG. 2B is a block diagram illustrating one embodiment of circuitry configured to provide provisioning information to provisioning circuits.

FIG. 2B is a block diagram of one embodiment of provisioning tables 168 within provisioning storage 160. During operation of computer system 100 (e.g., during system boot), element disable settings 164 may be accessed (e.g., by system firmware) to retrieve both provisioning type 204 and disable value 208. In the depicted embodiment, provisioning type 204 is included as part of provisioning information 170 sent to memory interface circuit and is also used to index into offset table 220 and mask tables 210.

As will be described, mask tables 210 may store, for each provisioning type, a corresponding address mask or masks that can be supplied to the selected provisioning circuit 150 to isolate portions of the physical memory address in memory access request 104. These portions include a portion that corresponds to the dimension that is being provisioned. For example, if dimensions for memory bank and memory column are not being provisioned by a particular provisioning circuit 150, the portions of the physical memory address corresponding to those dimensions can be masked off by an appropriate mask stored in mask table 210. Thus, where each provisioning operation has a different set of masks, provisioning type 204 may be used to select the appropriate set of masks as mask information 214, for inclusion as part of provisioning information 170 that is sent to memory interface circuit 120.

Provisioning type 204 can also be used to index into offset table 220 along with disable value 208. Offset table 220 stores so-called z-values, which are usable by provisioning circuits 150 to exclude certain elements of the dimension being provisioned. In various embodiments, offset table 220 includes multiple distinct tables of z-values, one for each provisioning type. Disable value 208 might indicate, for example, that memory controller 4 is to be disabled. The value of offset 224 for 4, however, may be a different value altogether (e.g., z may equal 5). Thus, when offset value 5 is supplied to the selected provisioning circuit 150, it will cause no memory access requests to be routed to memory associated with memory controller 4. The relationship between disable value 208 and z values will become clear as specific examples of provisioning operations are provided below.

In the depicted embodiment, mask information 214, offset 224, and provisioning type 204 constitute one example of provisioning information 170 that is supplied to memory interface circuit 120.

The foregoing examples suggest that for some implementations of memory subsystem 110, the potential for provisioning circuitry becoming complex is a very real possibility. For example, the number of memory dimensions, and/or the number of elements (i.e., routing options) in a given memory dimension may lead to many possibilities for how DRAM 140 might be provisioned. For example, consider an implementation with 8 memory controllers and 4 memory channels per memory controller. This configuration leads to many possible routings given that there are a large number of possible combinations of defective memory controllers or memory channels. This high number of possible routings presents a potential obstacle for efficient design of memory provisioning circuitry.

Figure 3A:
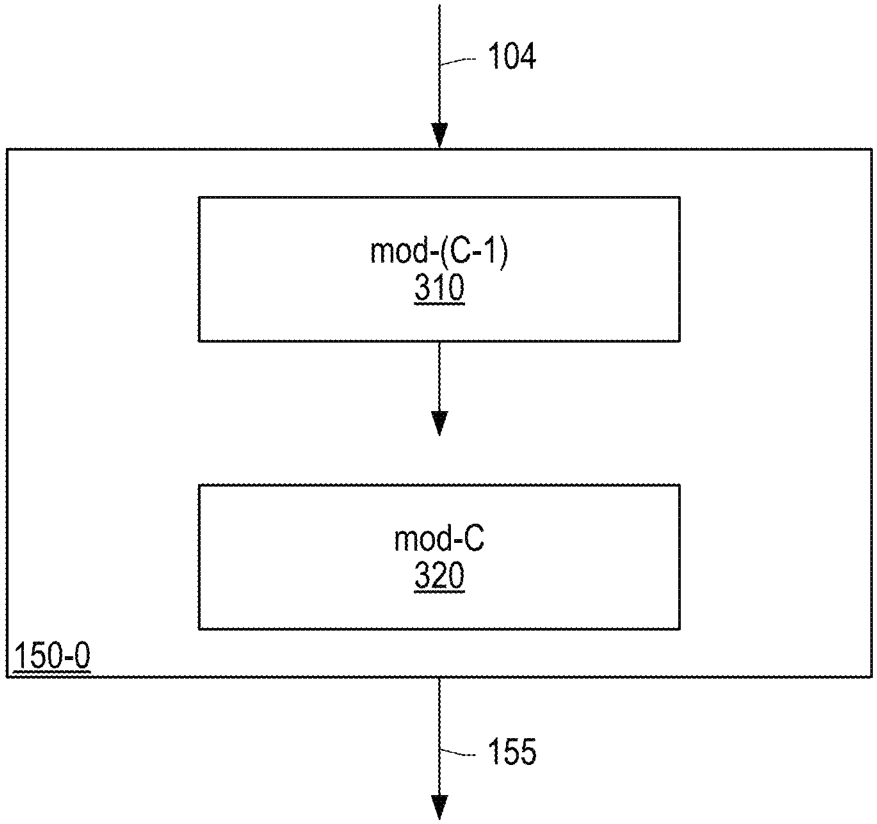
FIGS. 3A-B are block diagrams of provisioning circuits configured to perform both mod-(C−1) and mod-C operations.

The present inventor, however, has recognized that various types of contemplated provisioning operations may each be implemented using certain core functionality. FIG. 3A is a block diagram of one embodiment of a provisioning circuit 150-0 that illustrates this approach. As depicted, provisioning circuit 150-0 is configured to receive memory access request 104 and output set of selection signals 155. Internally, provisioning circuit 150-0 includes a mod-(C−1) circuit 310 and a mod-C circuit 320.

The value C as used herein indicates the number of elements in the dimension that is being provisioned. Thus, if a single memory controller circuit is being provisioned and there are 8 memory controller circuits in total, C=8. Conversely, if a pair of memory controller circuits are being provisioned and there are 8 memory controller circuits, C=4 since there are 4 pairs of memory controllers. By first performing a mod-(C−1) operation, circuit 310 will output a value that has only C−1 possible values. A subsequent mod-C operation by circuit 320 can also return C−1 possible values, but within the range that has C possibilities. As will be described with respect to FIG. 3B, an intermediate operation between circuits 310 and 320 (not pictured in FIG. 3A) can be used to determine which of the C possible outputs of circuit 320 is excluded as an output of provisioning circuit 150-0. This intermediate operation can be performed such that the excluded value can vary, thus allowing provisioning circuit 150-0 to provision different elements of the dimension being provisioned.

To summarize, memory access request 104 may include a physical memory address that specifies any of C values in the dimension being provisioned. Circuit 310 performs a mod-(C−1) operation that reduces the number of possible addressed elements within the provisioned dimension from C to C−1. A subsequent mod-C operation by circuit 320 still keeps the number of possible outputs at C−1 choices, but within a range that includes C elements. Varying a value such as offset 224 can cause the element with the C possible outputs of circuit 320 to also vary.

Figure 3B:
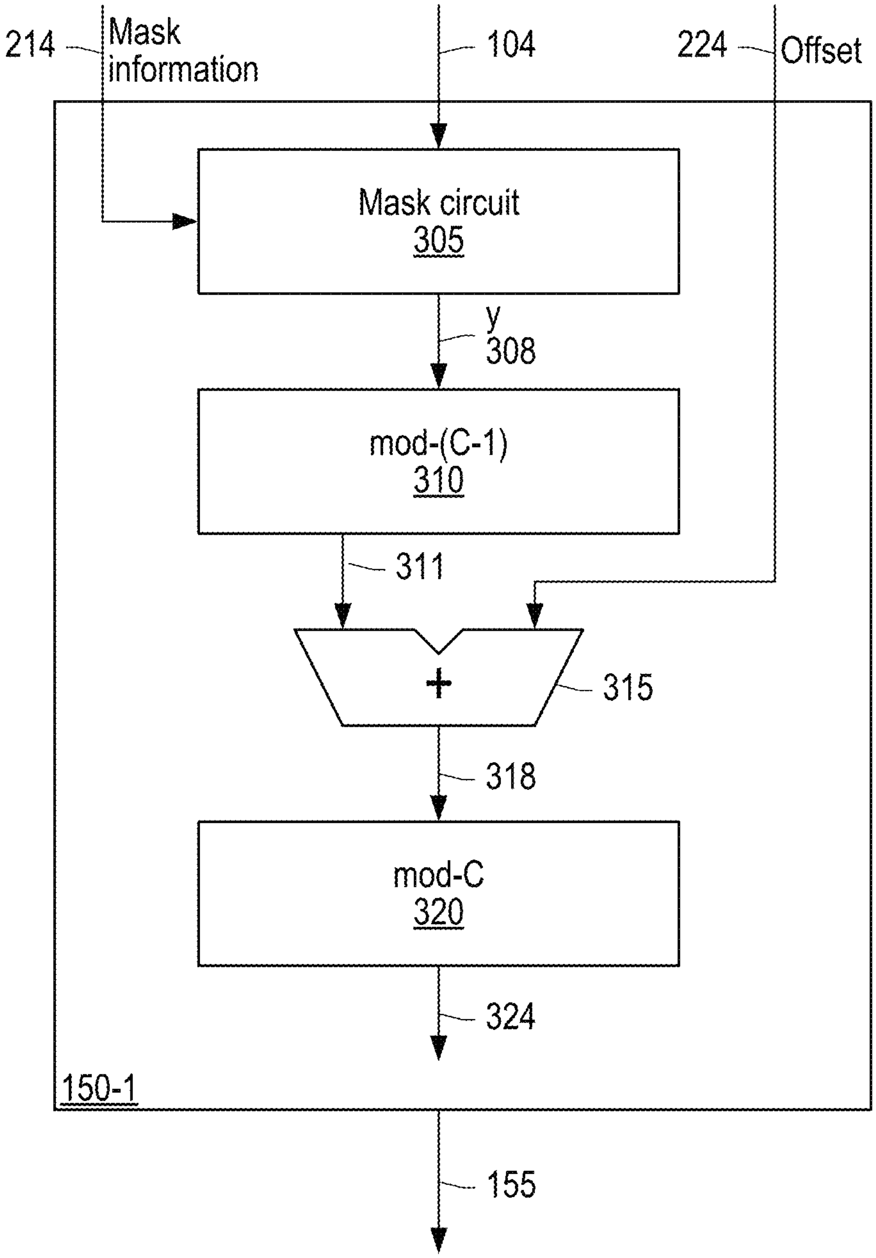

FIG. 3B is a block diagram of another embodiment of a provisioning circuit. As in provisioning circuit 150-0 shown in FIG. 3A, provisioning circuit 150-1 also includes mod-(C−1) circuit 310 and mod-C circuit 320. Additionally, provisioning circuit 150-1 includes mask circuit 305 and adder 315. The circuitry within generic provisioning circuit 150-1 forms the basis of specific provisioning circuits discussed below with respect to FIGS. 5C, 6C, 7C, and 8C. As will be described, provisioning circuit 150-1 implements the formula ((y mod (C−1))+z) mod C.

Mask circuit 305 is configured to receive memory access request 104 and apply a mask included in mask information 214 to the physical memory address in memory access request 104 to obtain a portion of the address that corresponds to at least the dimension that is being provisioned. The output of mask circuit 305 is denoted as the value y, which is indicated by reference numeral 308. As will be described, y value 308 is utilized by a remainder of the circuitry shown in FIG. 3A to generate set of selection signals 155 for at least the dimension being provisioned.

Because of their fundamental binary nature, addressing in computer systems is commonly based on powers of two. Thus, if an address is 11 bits, there are $2^{11}$, or 2048 possible address locations that may be specified. The various dimensions of the 11-bit address can each be specified using a portion of the bits. For example, 5 of the 11 bits might specify a first dimension having $2^5$, or 32, possibilities. Similarly, 1 of the remaining 6 bits might specify a second dimension having $2^1$, or 2, possibilities. Still further, 3 of the remaining 5 bits might specify a third dimension having $2^3$, or 8, possibilities. Finally, the remaining 2 bits might specify a fourth dimension having $2^2$, or 4, possibilities.

Thus, while a memory address is generally partitioned such that each dimension has a number of options that is a power of two, the act of provisioning a memory dimension can result in a number of routing dimensions that is not equal to a power of two. The purpose of mask circuit 305, in one embodiment, is to mask out portions of the physical memory address in memory access request 104 having dimensions that are not being provisioned and which can thus be specified with individual bits. Y value 308 thus can represent a portion of the address that corresponds to at least the dimension being provisioned, along with one or more other dimensions. This process will be illustrated in detail with respect to FIGS. 5-8.

As shown, y value 308 is provided to mod-(C−1) circuit 310, which outputs a value 311 having C−1 options (e.g., 0 to C−2). Thus, if C=8, there will be 7 options, 0 to 6. Adder 315 receives value 311 and offset 224 and outputs a sum 318 to mod-C circuit 320.

Because value 311 has only C−1 possible values, when a given offset 224 is added to value 311, there are still only C−1 possible values for sum 318. For example, if C=8, value 311 has the possible values 0-6. If offset 224=5, sum 318 has the possible values 5-11. The mod-C operation performed by circuit 320 can still produce only C−1 possible values for output 324—for example, for C=8 and offset 224=5, circuit 320 can output 5, 6, 7, 0, 1, 2, and 3. Accordingly, 4 is not a possible value for output 324. Thus, when offset 224-5, element 4 is being provisioned.

The specific one of the possible C outputs that cannot be produced by circuit 320 can be varied by changing offset 224. As noted, when C=8 and offset 224-5, 4 is not a possible value of output 324. But by changing offset 224 to 6, it can be seen that 5 is not a possible value of output 324. (Value 311 can be 0-6; sum 318 can be 6-12; output 324 can be 6, 7, and 0-4.)

In some implementations, output 324 is not the external output of provisioning circuit 150-1. As will be described in subsequent Figures, additional computations may be performed in some provisioning circuits 150 to produce set of selection signals 155. Also, in addition to the modulo operations shown in FIGS. 3A-B, provisioning circuits 150 may also perform div operations on y value 308 to generate selection signals for a different dimension. Still further, standard routing may be performed on those portions of the physical memory address that were masked off by mask circuit 305. Several examples of these additional operations are provided below with respect to FIGS. 5-8.

FIG. 3B thus depicts a provisioning circuit (150-1) that is included within a memory interface circuit (120) that is configured to receive a request (104) to access a memory subsystem of a computer system, where the request includes a physical memory address, and where the memory subsystem is organized according to a hierarchy having at least a first dimension and a second dimension. The first provisioning circuit (150-1) is configured to perform a first provisioning operation with respect to the first dimension that includes an arithmetic operation of the form ((y mod (C−1))+z) mod C, where C indicates a total number of elements in the first dimension, y (308) is a portion of the physical memory address corresponding to the first dimension, and z is an offset value (224) indicating a subset s of the C of elements in the first dimension that are not accessible by the memory interface circuit as a result of the first provisioning operation. Still further, the first provisioning circuit is configured to provide, as an output of the first provisioning operation, a first set of selection signals (155) that are usable to access some elements in the first dimension of the memory subsystem, but not those elements in subset s.

Standard Routing (No Defective Memory)

Before showing several examples of different provisioning circuits, it will be instructive to briefly consider an example of routing when there is no defective memory to be provisioned. In example 400 in FIG. 4, there are 8 memory controller circuits, 1 memory channel per controller, and 2 rows/per channel. (Other dimensions are ignored for this example.) Table 410 shows four different masks: $\sigma_1$, $\sigma_2$, $\sigma_3$, and $M_r$. Formulas 412 and 416 provide instructions for how to produce selection signals for the memory controller dimension (a) and the row dimension (r), respectively. As used herein, H in formula 412 is an operation in which an AND is performed and the number of 1's in the result is counted. If an even number of 1's exists in the result of the AND, then H=0; otherwise, H=1. The extraction operation in formula 416 includes an AND of the physical memory address and $M_r$. Bit positions in the result of the AND corresponding to bit positions in $M_r$ that are set to 0 are discarded. Thus, if a 4-digit address portion is masked with a value of $M_r$ that has only one bit set, the extraction value will be either 0 or 1. If a 4-digit address portion is masked with a value of $M_r$ that has three bits set, the extraction value will range from 0-7.

Resulting routing values for the memory controller dimension (a) and the row dimension (r) are shown in table 420. Consider the example of $x=7d=(0111)_2$. $H(x, \sigma_1)=H(111,001)=1$, $H(x, \sigma_2)=H(111,110)=0$, and $H(x, \sigma_3)=H(111,100)=1$. Accordingly, $a=(1, 0, 1)=(101)_2=5$. The value of $r=M_r$ AND $(0111)_2=(0000)_2$. The extracted value of $(0000)_2$ is 0, since the lower three bits are discarded, leaving the remaining 0.

Provisioning Operations

Removal of a Single Memory Controller Circuit

Figure 5A:
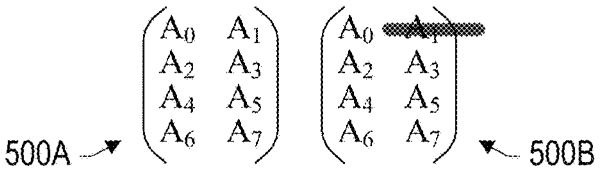
Figure 5A:
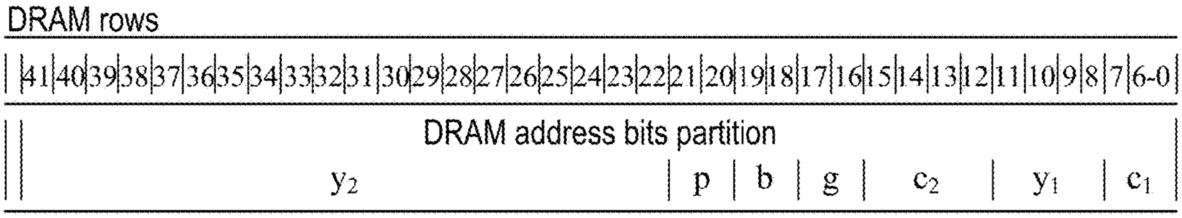

FIG. 5A illustrates a first possible type of provisioning-removal of a single memory controller circuit. Consider eight memory controller circuits $A_0$-$A_7$ depicted in example 500A. Example 500B illustrates the removal of a single memory controller, in this case, $A_1$.

Partitioning 500C illustrates one example of how 42 physical memory address bits might be assigned to different dimensions and what bits correspond to y value 308. Eleven bits (concatenation of $c_2+c_1$; 15-12, and 6-0) are used to address a 2K page size in this example, while 2 bits (denoted as p; positions 21-20) are used to address 4 channels, 2 bits (denoted as g; positions 17-16) are used to address 4 bank groups, and 2 bits (denoted as b; positions 19-18) are used to address 4 banks. The remaining bits y (concatenation of $y_2+y_1$) may be used to encode 7 memory controllers (a) as well as the DRAM rows (r). Many other partitions are possible.

Table 500D illustrates the relationship between disable value 208 (corresponding to the column in Table 500D entitled "Memory controller removed") and offset 224 (corresponding to the column in Table 500D entitled "z"). Accordingly, if it is desired to remove memory controller circuit 2, offset 224=3 should be supplied to the selected provisioning circuit 150. The values of table 500D can be proven by performing a mod-7 operation on an input value, adding different offset values, and then determining which value cannot result from the output of an ensuing mod-8 operation.

Note that Table 500D does not contemplate the possibility of removing memory controller circuit 0. In some embodiments, such a memory controller circuit may be considered a "master" memory controller that is not possible to remove. Accordingly, table 500D has no row in which z=1. Such a restriction is not contemplated in every embodiment, though.

FIG. 5B illustrates an example of the first provisioning type. In example 501, there are 8 memory controllers (a), denoted as 0-7. Additionally, there is one memory channel per controller, and two rows (r) per memory channel. Suppose in this example that it is desired to remove memory controller 4. As can be seen in table 500D, the z value will be 5. With memory controller 4 removed, this leaves 14 possible physical memory addresses. Formulas 502A-B show how to derive selection signals for the memory controller dimension (a) and the row dimension (r), respectively. Note that formula 502A is a specific version of the generic provisioning formula ((y mod (C−1))+z) mod C described above. Table 503 illustrates the mask information 214 for this provisioning type ($\sigma_2$ and $M_r$), while table 504 shows the values of a and r for the 14 possible physical memory addresses.

Consider the specific example when $x=7d=(0111)_2$. The value x AND $\sigma_2$ equals $(0111)_2=7$. The value a thus equals (7 mod 7)+5) mod 8=5. The value of r, on the other hand, is 1 (x AND $M_r=(0111)_2$, the extraction value is 7, and 7 div 7=1).

Figure 5C:
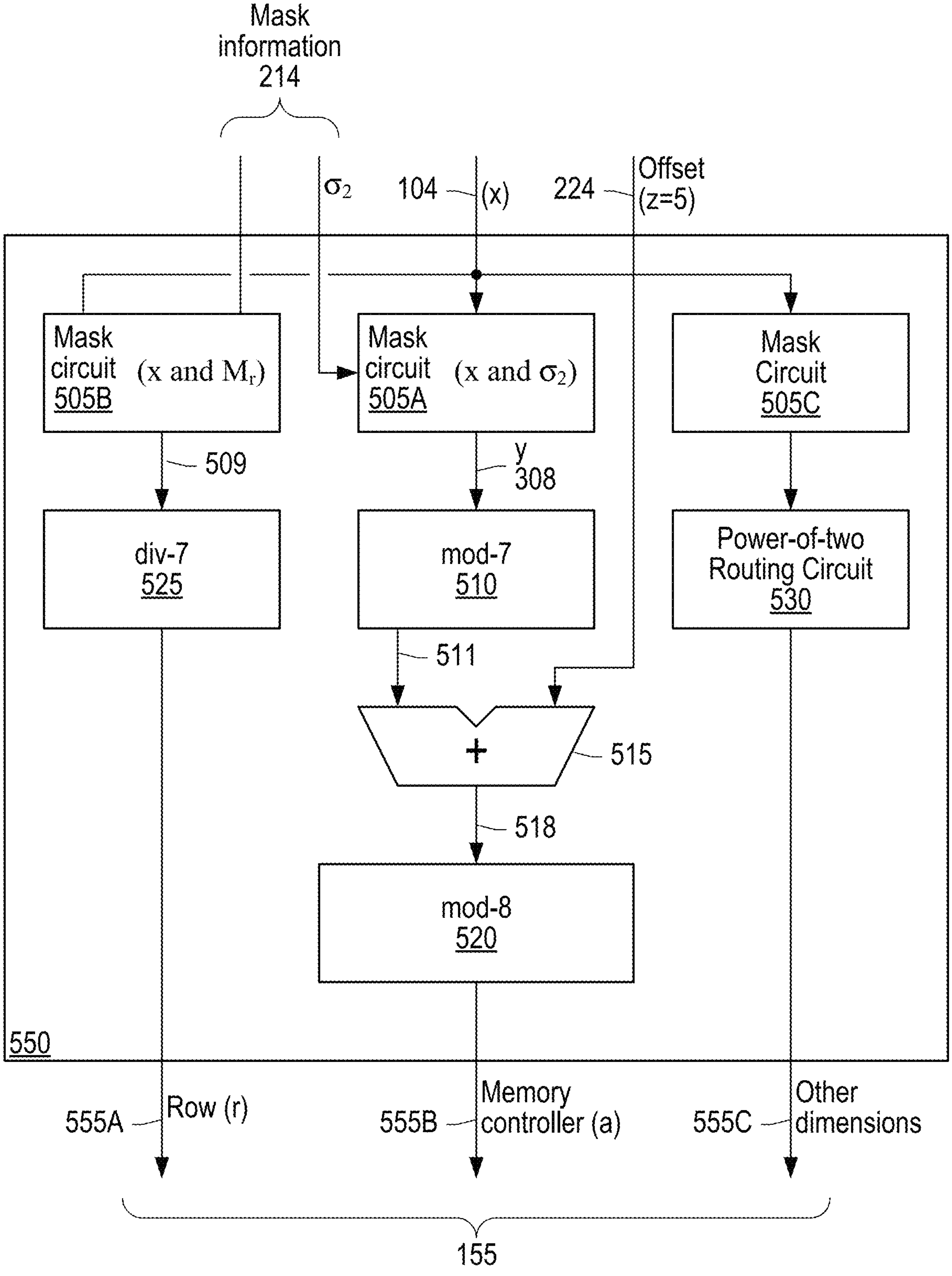

FIG. 5C is a block diagram of one embodiment of a provisioning circuit that implements the routing values shown in table 504. As depicted, provisioning circuit 550 is configured to receive memory access request 104, and provisioning information 170 that includes mask information 214 and offset 224 (z=5 in this particular example). Note that provisioning circuit 550 may be selected for use in the first instance by routing circuit 127 based on provisioning type 204. Provisioning circuit 550 also includes a variety of internal components, including mask circuits 505A-C, div-7 circuit 525, mod-7 circuit 510, power-of-two routing circuit 530, adder 515, and mod-8 circuit 520.

As can be seen, provisioning circuit 550 is configured to output set of selection signals 155 that include row selection signals 555A, memory controller selection signals 555B, and selection signals 555C for other dimensions. Mask circuit 505C can apply a mask to the physical memory address (x) in memory access request 104 that isolates certain portions of the address to which standard power-of-two routing can be applied. In this manner, selection signals 555C for dimensions such as bank, bank group, etc. may be determined. Remaining portions of physical memory address x may be provided to mask circuits 505A-B so that selection signals for the memory controller and row dimensions may be determined.

Memory controller selection signals 555B may be generated by circuitry that implements the formula ((y mod (C−1))+z) mod C, where C=8 and z=5. Recall that C refers to the total number of elements in the dimension being provisioned. Y value 308 is generated by mask circuit 505A by applying mask value $\sigma_2$ to physical memory address x.

Mod-7 circuit 510 receives y value 308 and generates one of seven possible values at output 511 (0-6). Structures of non-power-of-two modulo circuits are known in the art. See U.S. Pat. No. 12,050,532, entitled, "Routing Circuit for Computer Resource Topology," (the '532 patent), which is hereby incorporated by reference. Output 511 and offset 224 (z=5) are inputs to adder 515, which outputs sum 518. Sum 518 is then provided to mod-8 circuit 520. Note that mod-8 circuit 520 may be simple in design since a power of two is involved-circuit 520 may simply consist of a two-input AND gate where one input is sum 518 and the other input is the value $(0111)_2$. Circuit 520 will thus output the three least-significant bits of sum 518 as memory controller selection signals 555B.

The row dimension may be resolved by mask circuit 505B applying mask $M_r$ to physical memory address x. Result 509 may be provided to div-7 circuit 525, whose structure may be derived from principles outlined in the'532 patent. The outputs of div-7 circuit 525 are selection signals 555A, which are usable to select the appropriate value of the row dimension.

Note the dimension for which an element is being removed (memory controller dimension) may be provisioned by circuit 550 using a series of mod operations, along with provisioning of another dimension (row dimension) using a div operation. More specifically, the memory controller dimension is provisioned beginning with a mod-7 operation, whereas the row dimension is provisioned using a div-7 operation. This approach is a specific example of the mod-n/div-n approach disclosed in the '532 patent in order to achieve an efficient mapping of physical memory addresses to physical memory locations. Other dimensions are masked off and may be handling using standard techniques within power-of-two routing circuit 530.

Removal of a Pair of Memory Controller Circuits

Figure 6A:
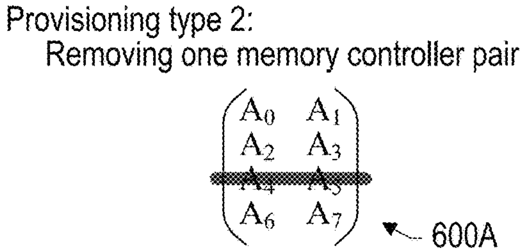
Figure 6A:
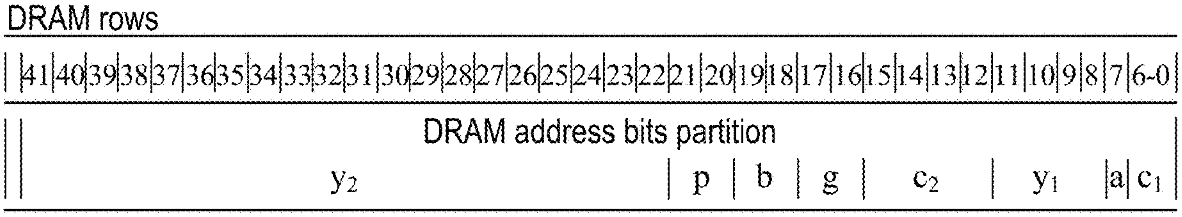

FIG. 6A illustrates a second possible type of provisioning-removal of a pair of memory controller circuits. Consider eight memory controller circuits $A_0$-$A_7$ depicted in example 600A, where memory controller circuits $A_4$ and $A_5$ are to be removed.

Partitioning 600B illustrates one example of how 42 physical memory address bits might be assigned to different dimensions and what bits correspond to y value 308. Eleven bits (concatenation of $c_2+c_1$; 15-12, and 6-0) are used to address a 2K page size in this example, while 2 bits (denoted as p; positions 21-20) are used to address 4 channels, 2 bits (denoted as g; positions 17-16) are used to address 4 bank groups, and 2 bits (denoted as b; positions 19-18) are used to address 4 banks. Of the remaining bits, one bit (denoted as a; position 7) may be used to encode either the left or right memory controller column in the matrix in example 600A. The remaining bits y (concatenation of $y_2+y_1$) may be used to encode 3 memory controller pairs as well as the DRAM rows (r). Many other partitions are possible.

Table 600C illustrates the relationship between disable value 208 (corresponding to the column in Table 600C entitled "Memory controllers removed") and offset 224 (corresponding to the column in Table 600C entitled "z"). Accordingly, if it is desired to remove memory controller circuits 4 and 5, offset 224=3 should be supplied to the selected provisioning circuit 150.

Note that Table 600C does not contemplate the possibility of removing memory controller circuits 0 and 1. Accordingly, table 600C has no row in which z=1. Such a restriction is not contemplated in every embodiment, though.

FIG. 6B illustrates an example of the second provisioning type. In example 601, there are 8 memory controllers (a), denoted as 0-7. Additionally, there is one memory channel per controller, and two rows (r) per memory channel. Suppose in this example that it is desired to remove memory controllers 4 and 5. As can be seen in table 500D, the z value will be 3. With memory controllers 4 and 5 removed, this leaves 12 possible physical memory addresses. Formulas 602A-B show how to derive selection signals for the memory controller dimension (a) and the row dimension (r), respectively. Note that formula 602A includes a specific version of the generic provisioning formula ((y mod (C−1))+z) mod C described earlier. Table 603 illustrates the mask information 214 for this provisioning type ($\sigma_1$, $\sigma_2$ and $M_r$), while table 604 shows the values of a and r for the 12 possible physical memory addresses.

Consider the specific example when $x=7=(0111)_2$. H(x, $\sigma_1$)=H (0111, 0001)=1. X AND $\sigma_2$ equals $(0110)_2$, or 6. The value ((6 mod 3)+3) mod 4 is 3. Solving for a, formula 602A evaluates to 1+(3×2), or 7. The value of r, on the other hand, is 1 (x AND $M_r=(0110)_2$, the extraction value is 3, and 3 div 3=1).

Figure 6C:
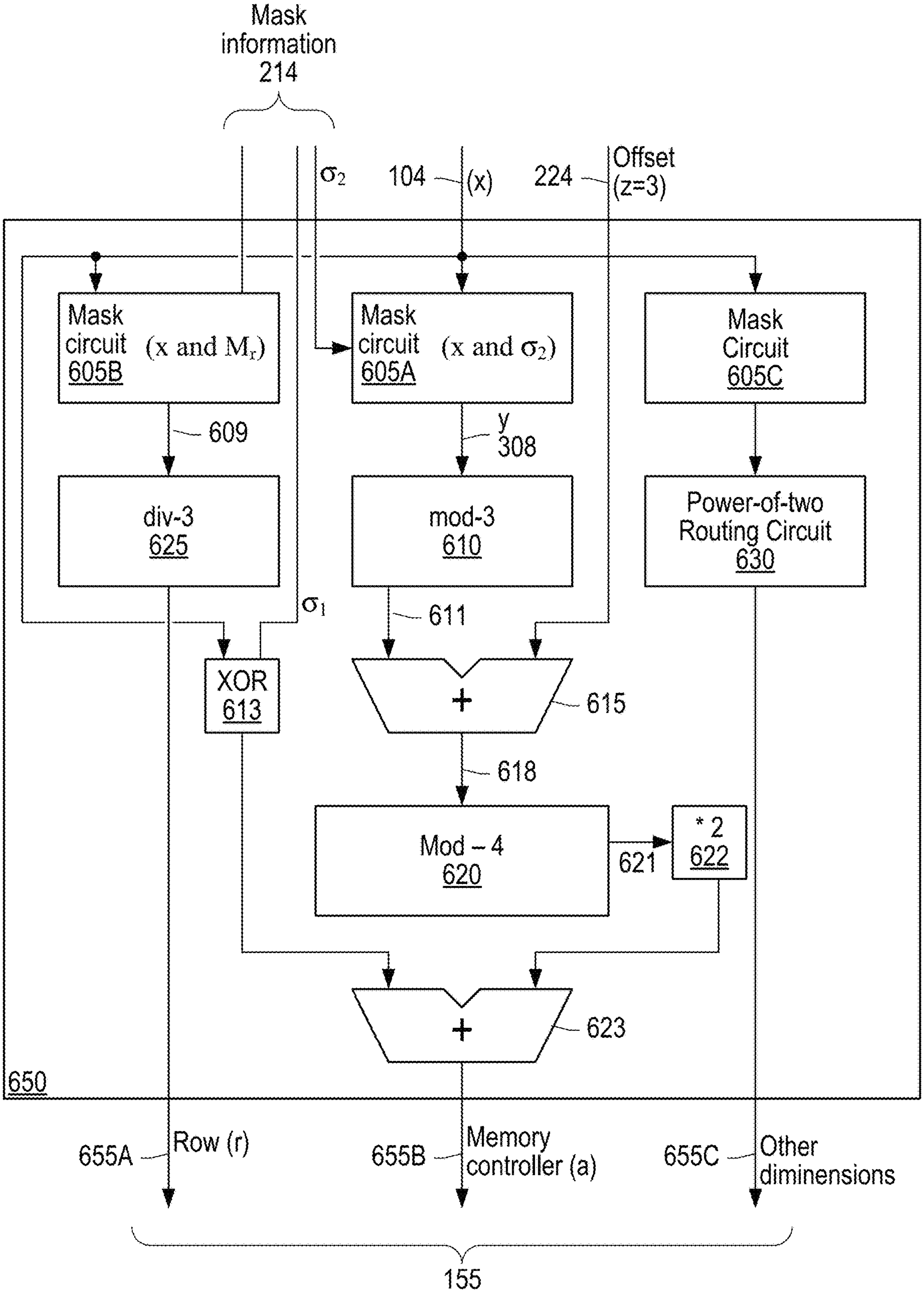

FIG. 6C is a block diagram of one embodiment of a provisioning circuit that implements the routing values shown in table 604. As depicted, provisioning circuit 650 is configured to receive memory access request 104, and provisioning information 170 that includes mask information 214 and offset 224 (z=3 in this example). Note that provisioning circuit 650 may be selected for use in the first instance by routing circuit 127 based on provisioning type 204. Provisioning circuit 650 also includes a variety of internal components, including mask circuits 605A-C, div-3 circuit 625, mod-3 circuit 610, power-of-two routing circuit 630, XOR circuit 613, adder 615, mod-4 circuit 620, multiplier 622, and adder 623.

As can be seen, provisioning circuit 650 is configured to output set of selection signals 155 that include row selection signals 655A, memory controller selection signals 655B, and selection signals 655C for other dimensions. Mask circuit 605C can apply a mask to the physical memory address (x) in memory access request 104 that isolates certain portions of the address to which standard power-of-two routing can be applied. In this manner, selection signals 655C for dimensions such as bank, bank group, etc. may be determined. Remaining portions of address x may be provided to mask circuits 605A-B so that selection signals for the memory controller and row dimensions may be determined.

Memory controller selection signals 655B may be generated by circuitry that implements the formula ((y mod (C−1)+z)) mod C, where C-4 and z=3. Recall that C refers to the total number of elements in the dimension being provisioned. Here, because memory controller pairs are being provisioned, C=4 since there are four possible pairs of memory controllers. Y value 308 is generated by mask circuit 605A by applying mask value $\sigma_2$ to physical memory address x.

Mod-3 circuit 610 receives y value 308 and generates one of three possible values of output 611 (0-2). The ’532 patent discloses a particular implementation of a mod-3 circuit. Output 611 and offset 224 (z=3) are inputs to adder 615, which outputs sum 618. Sum 618 is then provided to mod-4 circuit 620. Note that mod-4 circuit 620 may be simple in design since a power of two is involved-circuit 620 may simply consist of a two-input AND gate where one input is sum 618 and the other input is the value $(0011)_2$. Circuit 620 will thus output the two least-significant bits of sum 618 as output 621. Output 621 is then multiplied by two (which may simply consist of output 621 being left-shifted one bit position), and the product supplied as one input of adder 623. The other input to adder 623 is the output of XOR operation performed by XOR circuit on physical memory address x and mask $\sigma_1$. The output of adder 623 constitutes memory controller (a) selection signals 655B.

Note how the internals of provisioning circuits 550 and 650 differ. Because provisioning circuit 650 is removing access to a pair of memory controllers, the output of mod-4 circuit will be 3 of 4 possible values, based on the value of offset 224, which will determine which pair value is excluded. Once a pair value is obtained, it is multiplied by 2 so that the memory controller dimension can address all possible pairs. Note that pair 0 addresses controllers 0 and 1 (pair 0×2=0); pair 1 addresses controllers 2 and 3 (pair 1×2=2); pair 2 addresses controllers 4 and 5 (pair 2×2=4); and pair 3 addresses controllers 6 and 7 (pair 3×2=6). The output of multiplier 622 is thus 0, 2, 4, or 6, although one of these values will not be possible based on the value of offset 224. By adding in the output of XOR circuit 613 (0 or 1), this determines whether memory controller select signal 655B will address a memory controller in the left or right column of table 600A. This allows signals 655B to represent 6 of the 8 possible memory controller values.

The row dimension may be resolved by mask circuit 605B applying mask $M_r$ to physical memory address x. Result 609 may be provided to div-3 circuit 625, one possible structure for which is disclosed in the ’532 patent. The outputs of div-3 circuit are selection signals 655A, which are usable to select the appropriate value of the row dimension.

Again, note the dimension for which an element is being removed (memory controller dimension) may be provisioned by circuit 650 using a series of mod operations, along with provisioning of another dimension (row dimension) using a div operation. More specifically, the memory controller dimension is provisioned beginning with a mod-3 operation, whereas the row dimension is provisioned using a div-3 operation. This approach is a specific example of the mod-n/div-n approach disclosed in the ’532 patent in order to achieve an efficient mapping of physical memory addresses to physical memory locations. Other dimensions are masked off and may be handling using standard techniques within power-of-two routing circuit 630.

Removal of a Single Memory Channel

Figure 7A:
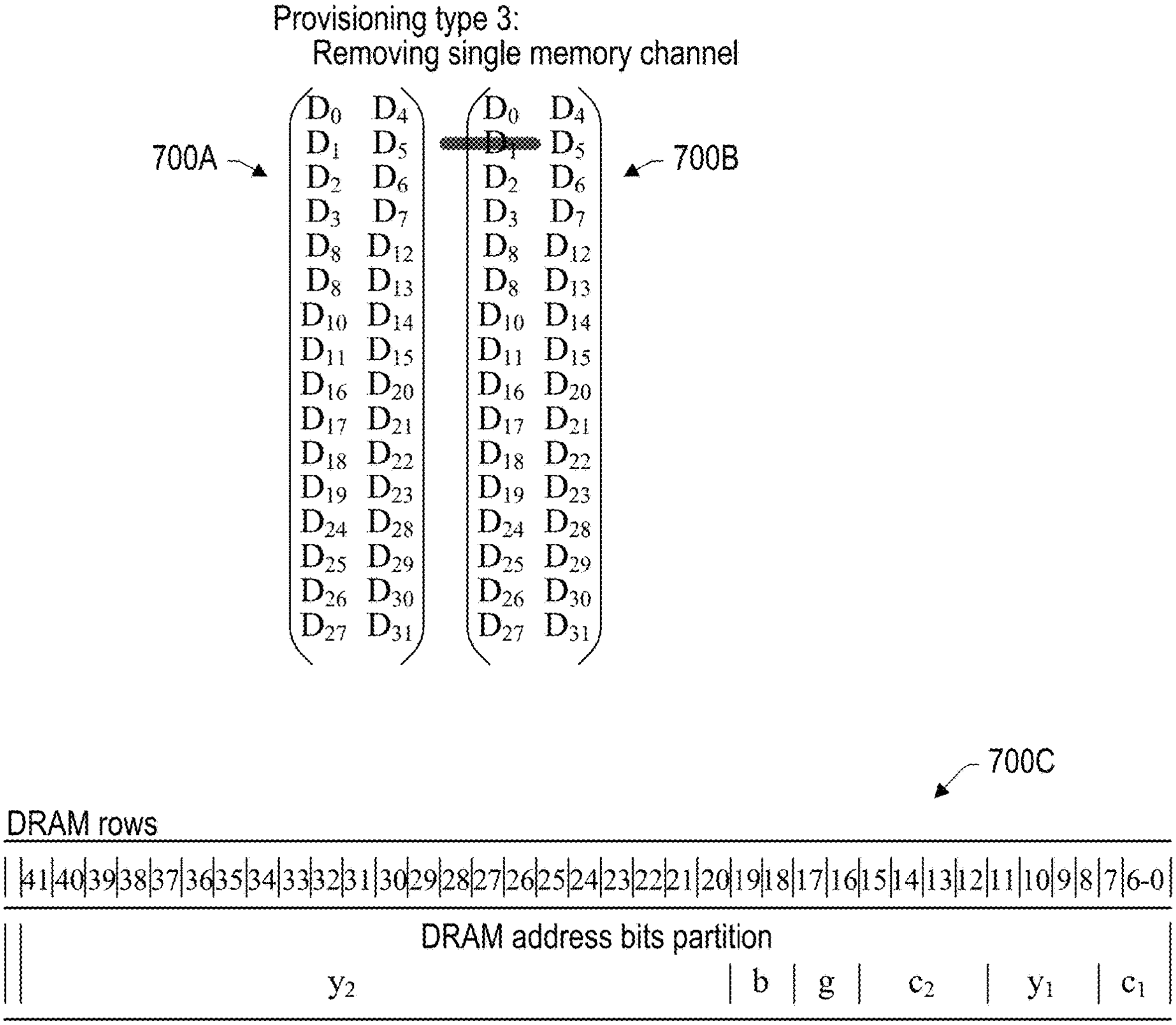

FIG. 7A illustrates a third possible type of provisioning-removal of a single memory channel. Consider 32 memory channels $D_0$-$D_{31}$ depicted in example 700A, where memory channel $D_1$ is to be removed as shown in example 700B.

Partitioning 700C illustrates one example of how 42 memory physical memory address bits might be assigned to different dimensions and what bits correspond to y value 308. Eleven bits (concatenation of $c_2$+$c_1$; 15-12, and 6-0) are used to address a 2K page size in this example, 2 bits (denoted as g; positions 17-16) are used to address 4 bank groups, and 2 bits (denoted as b; positions 19-18) are used to address 4 banks. The remaining bits y (concatenation of $y_2$+$y_1$) may be used to encode 31 memory channels (which includes a memory controller a and a local channel p) as well as the DRAM rows (r). Many other partitions are possible.

FIG. 7B illustrates an example of the third provisioning type. In example 701, there are 8 memory controllers (a), denoted as 0-7. There are four memory channels per controller, meaning that there are 0-31 possible global channels, denoted as d. Additionally, the 32 channels can also be represented by a memory controller (a) and a local channel (0-3; p). Still further, there are two rows (r) per memory channel. Suppose in this example that it is desired to remove global memory channel 9, which corresponds to a z value of 10. With memory channel 9 removed, there are 62 possible physical memory addresses. Formulas 702A-D show how to derive selection signals for the memory controller dimension (a) and the row dimension (r). Note that formula 702A, which calculates global memory channel d, includes a specific version of the generic provisioning formula ((y mod (C−1))+z) mod C described earlier. Once d is calculated using formula 702A, the memory controller (a) and local channel (p) may be computed using formulas 702B-C, respectively. Formula 702D may be used to compute the row dimension. Table 703 illustrates the mask information 214 for this provisioning type ($\sigma_2$ and $M_r$), while table 704 shows the values of d, a, p, and r for the 62 possible physical memory addresses.

Consider the specific example when x=7=$(00111)_2$. The value x AND $\sigma_2$ is $(00111)_2$. The value d is thus (7 mod 31+10) mod 32, or 17. The value a (memory controller) is thus 4 (17 div 4), while the value p (local channel) is 1 (17 mod 4). The value of r, on the other hand, is 0 (x AND $M_r$=$(00111)_2$; the extraction value is 7, and 7 div 31=0).

Figure 7C:
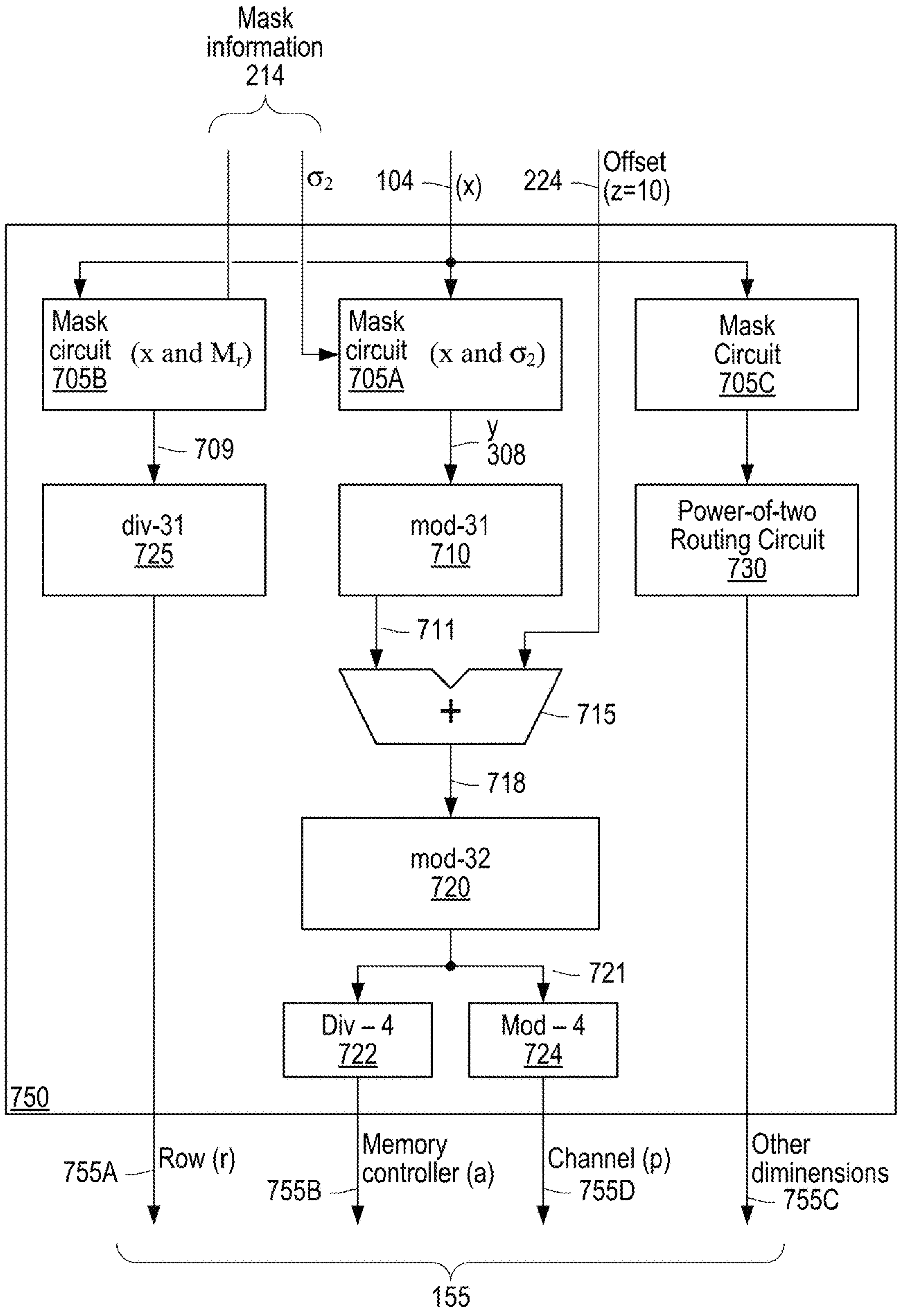

FIG. 7C is a block diagram of one embodiment of a provisioning circuit that implements the routing values shown in table 704. As depicted, provisioning circuit 750 is configured to receive memory access request 104, and provisioning information 170 that includes mask information 214 and offset 224 (z=10). Note that provisioning circuit 750 may be selected for use in the first instance by routing circuit 127 based on provisioning type 204. Provisioning circuit 750 also includes a variety of internal components, including mask circuits 705A-C, div-31 circuit 725, mod-31 circuit 710, power-of-two routing circuit 730, adder 715, mod-32 circuit 720, div-4 circuit 722, and mod-4 circuit 724.

As can be seen, provisioning circuit 750 is configured to output set of selection signals 155 that include row selection signals 755A, memory controller selection signals 755B, channel selection signals 755D, and selection signals 755C for other dimensions. Mask circuit 705C can apply a mask to the physical memory address (x) in memory access request 104 that isolates certain portions of the address to which standard power-of-two routing can be applied. In this manner, selection signals 755C for dimensions such as bank, bank group, etc. may be determined. Remaining portions of physical memory address x may be provided to mask circuits 705A-B so that selection signals for the memory controller, channel, and row dimensions may be determined.

Memory controller selection signals 755B and channel selection signals 755D may be generated by circuitry that implements the formula ((y mod (C−1))+z) mod C, where C=32 and z=10. Recall that C refers to the total number of elements in the dimension being provisioned. Here, because memory channels are being provisioned, C=32 since there are 32 possible memory channels. Y value 308 is generated by mask circuit 705A by applying mask value $\sigma_2$ to physical memory address x.

Mod-31 circuit 710 receives y value 308 and generates one of 31 possible values for output 711 (0-30). Techniques disclosed in the '532 patent can be used for designing a mod-31 circuit, for example. Output 711 and offset 224 (z=10) are inputs to adder 715, which outputs sum 718. Sum 718 is then provided to mod-32 circuit 720. Note that mod-32 circuit 720 may be simple in design since a power of two is involved-circuit 720 may simply consist of a two-input AND gate where one input is sum 718 and the other input is the value $(11111)_2$. Circuit 720 will thus output the five least-significant bits of sum 718 as output 721. Output 721 corresponds to the d value, from which both the memory controller value (a) and local channel (p) can be generated. The a value is the output of div-4 circuit 722, while the p value is the output of mod-4 circuit 724.

Note that in provisioning circuit 750, the base formula is used to generate the global memory channels, which can then be decomposed into memory controller and local channel portions using div and mod operations, respectively. For example, consider a scenario in which the output of mod-32 circuit 720 is 27. The output of div-4 circuit 722 would be 6, while the output of mod-4 circuit 724 would be 3. Collectively these outputs would specify memory controller 6 on signals 755B and memory local memory channel 3 within memory controller 6 on signals 755D. FIG. 7C thus illustrates the general proposition that a provisioning circuit may be used to generate a value within a specific range (here, 0 to 31, with one possible value being excluded based on the z value), and the generated value may be decomposed into specific components (here memory controller and memory channel dimensions) using div-n/mod-n operations.

The row dimension may be resolved by mask circuit 705B applying mask $M_r$ to physical memory address x. Result 709 may be provided to div-31 circuit 725, which can be implemented, for example, using techniques disclosed in the '532 patent. The outputs of div-31 circuit are selection signals 755A, which are usable to select the appropriate value of the row dimension.

Again, note the dimension for which an element is being removed (memory channel dimension) may be provisioned by circuit 750 using a series of mod operations, along with provisioning of another dimension (row dimension) using a div operation. More specifically, the memory controller dimension is provisioned beginning with a mod-31 operation, whereas the row dimension is provisioned using a div-31 operation. This approach is a specific example of the mod-n/div-n approach disclosed in the '532 patent in order to achieve an efficient mapping of physical memory addresses to physical memory locations. Other dimensions are masked off and may be handling using standard techniques within power-of-two routing circuit 730.

Removal of a Pair of Memory Channels

Figure 8A:
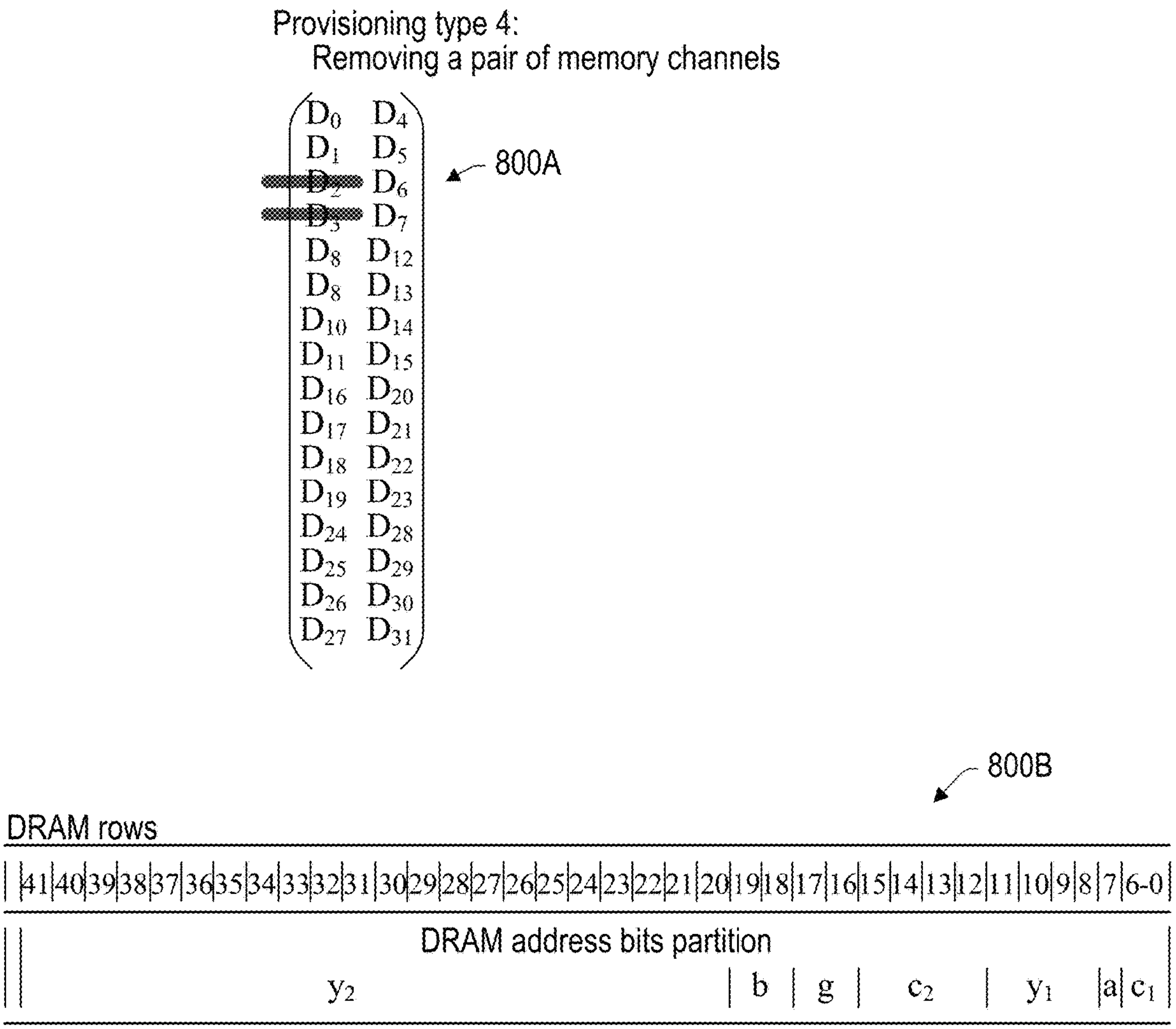

FIG. 8A illustrates a fourth possible type of provisioning-removal of a pair of memory channels. Consider 32 memory channels $D_0$-$D_{31}$ depicted in example 800A, where memory channels $D_2$-$D_3$ are to be removed. Partitioning 800B illustrates one example of how 42 memory physical memory address bits might be assigned to different dimensions and what bits correspond to y value 308. Eleven bits (concatenation of $c_2+c_1$; positions 15-12, and 6-0) are used to address a 2K page size in this example, 2 bits (denoted as g; positions 17-16) are used to address 4 bank groups, 2 bits (denoted as b; positions 19-18) are used to address 4 banks, and 1 bit (denoted as a; position 7) is used to differentiate between the left and right columns in example 800A. The remaining bits y (concatenation of $y_2+y_1$) may be used to encode 15 memory channel pairs (which includes a memory controller a and a local channel p) as well as the DRAM rows (r). Many other partitions are possible.

FIG. 8B illustrates an example of the fourth provisioning type. In example 801, there are 8 memory controllers (a), denoted as 0-7. There are four memory channels per controller, meaning that there are 0-31 possible global channels, denoted as d. Additionally, the 32 channels can also be represented by a memory controller (a) and a local channel (0-3; p). Still further, there are two rows (r) per memory channel. Suppose in this example that it is desired to remove global memory channels 30 and 31, which corresponds to a z value of 0. With memory channels 30-31 removed, there are 60 possible physical memory addresses. Formulas 802A-D show how to derive selection signals for the memory controller dimension (a), the channel dimension (p), and the row dimension (r). Note that formula 802A, which calculates global memory channel d, includes a specific version of the generic provisioning formula ((y mod (C−1))+z) mod C that was described earlier. Once d is calculated using formula 802A, the memory controller (a) and local channel (p) may be computed using formulas 802B-C, respectively. Formula 802D may be used to compute the row dimension. Table 803 illustrates the mask information 214 for this provisioning type ($\sigma_1$, $\sigma_2$, and $M_r$).

Consider the specific example when $x=7=(000111)_2$. The value $H(x,\sigma_1)=1$, while x AND $\sigma_2$ is $(000110)_2$, or 6. The value d is thus (1+6 mod 15+0) mod 16*2, or 13. The value a (memory controller) is thus 3 (13 div 4), while the value p (local channel) is 1 (13 mod 4). The value of r, on the other hand, is 0 (x AND $M_r=(00110)_2$; the extraction value is 6, and 6 div 15=0).

Figure 8C:
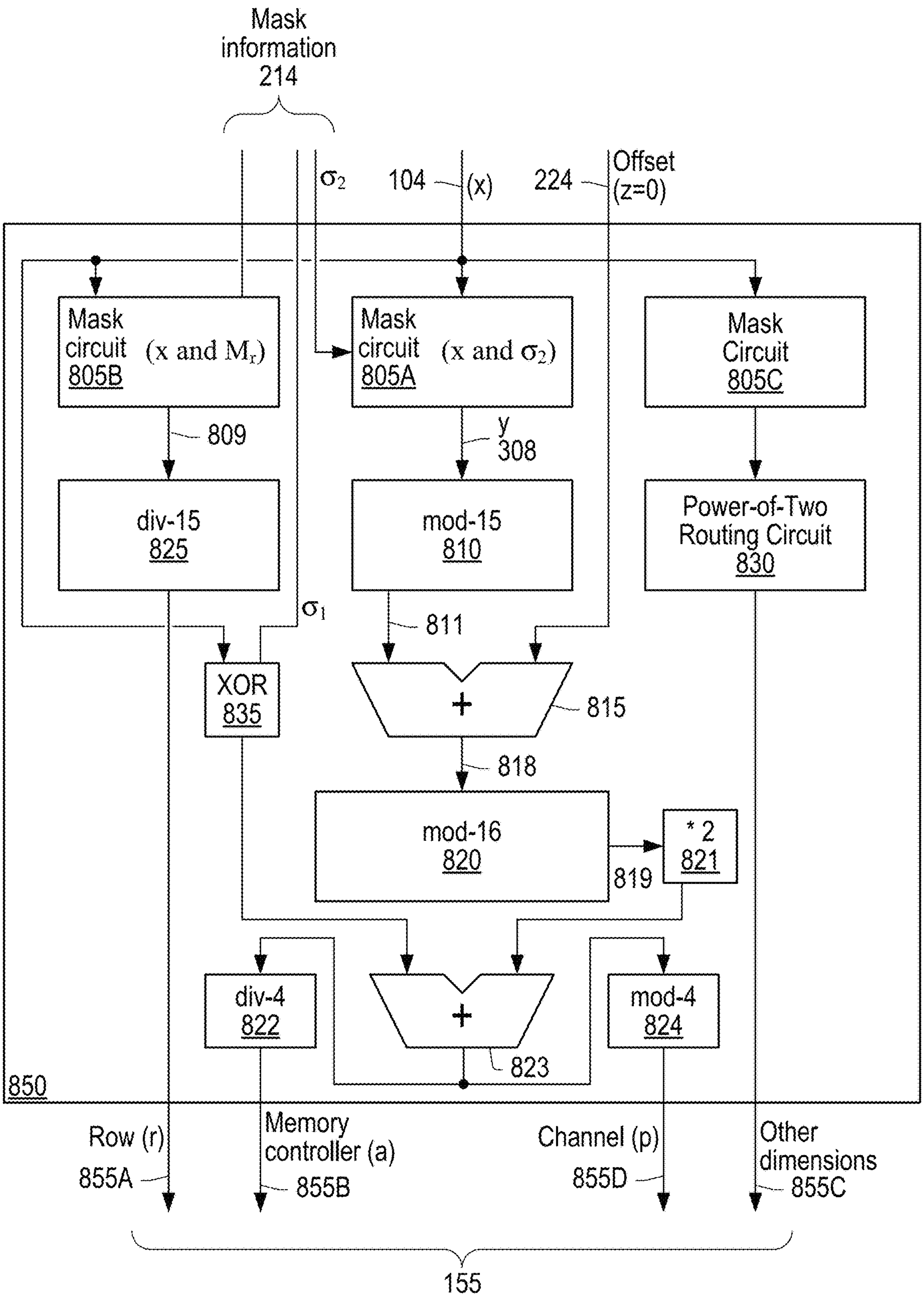

FIG. 8C is a block diagram of one embodiment of a provisioning circuit that implements the routing values for formulas 802. As depicted, provisioning circuit 850 is configured to receive memory access request 104, and provisioning information 170 that includes mask information 214 and offset 224 (z=0). Note that provisioning circuit 850 may be selected for use in the first instance by routing circuit 127 based on provisioning type 204. Provisioning circuit 850 also includes a variety of internal components, including mask circuits 805A-C, div-15 circuit 825, mod-15 circuit 810, power-of-two routing circuit 830, XOR circuit 835, adder 815, mod-16 circuit 820, multiplier circuit 821, div-4 circuit 822, mod-4 circuit 824, and adder 823.

As can be seen, provisioning circuit 850 is configured to output set of selection signals 155 that include row selection signals 855A, memory controller selection signals 855B, channel selection signals 855D, and selection signals 855C for other dimensions. Mask circuit 805C can apply a mask to the physical memory address (x) in memory access request 104 that isolates certain portions of the address to which standard power-of-two routing can be applied. In this manner, selection signals 855C for dimensions such as bank, bank group, etc. may be determined. Remaining portions of physical memory address x may be provided to mask circuits 805A-B so that selection signals for the memory controller, channel, and row dimensions may be determined.

Memory controller selection signals 855B and channel selection signals 855D may be generated by circuitry that implements the formula ((y mod (C−1))+z) mod C, where C=16 and z=0. Recall that C refers to the total number of elements in the dimension being provisioned. Here, because pairs of memory channels are being provisioned, C=16 since there are sixteen possible memory channel pairs. Y value 308 is generated by mask circuit 805A by applying mask value $\sigma_2$ to physical memory address x.

Mod-15 circuit 810 receives y value 308 and generates one of fifteen possible values for output 811 (0-14). The '532 patent discloses structure for a mod-15 circuit. Output 811 and offset 224 (z=0) are inputs to adder 815, which outputs sum 818. Sum 818 is then provided to mod-16 circuit 820. Note that mod-16 circuit 820 may be simple in design since a power of two is involved-circuit 820 may simply consist of a two-input AND gate where one input is sum 818 and the other input is the value $(1111)_2$. Circuit 720 will thus output the four least-significant bits of sum 818 as output 819. Output 819 is provided to multiplier 821, which may be configured to perform a single-bit left shift of output 819 to effectuate a multiplication by two. This output is provided as one input to adder 823; the other input is the output of XOR circuit 813. The sum generated by adder 823 is the value d, which is decomposed into the memory controller selections signals 855B (a value; generated by div-4 circuit 822) and channel selection signals 855 (p value; generated by mod-4 circuit 824).

Note that in provisioning circuit 850, the base formula is used to generate the global memory channels, which can then be decomposed into memory controller and local channel portions. Also note that provisioning circuit includes features of both provisioning circuit 650 (compare XOR circuit 813 to XOR circuit 613 and multiplier 821 to multiplier 622) and provisioning circuit 750 (compare div-4 circuit 722 to div-4 circuit 822 and mod-4 circuit 724 to mod-4 circuit 824).

The row dimension may be resolved by mask circuit 805B applying mask $M_r$ to physical memory address x. Result 709 may be provided to div-15 circuit 825, which can be implemented, for example, using techniques disclosed in the '532 patent. The outputs of div-15 circuit 825 are selection signals 855A, which are usable to select the appropriate value of the row dimension.

Again, note the dimension for which an element is being removed (memory channel dimension) may be provisioned by circuit 850 using a series of mod operations, along with provisioning of another dimension (row dimension) using a div operation. More specifically, here the memory controller dimension is provisioned beginning with a mod-15 operation, whereas the row dimension is provisioned using a div-15 operation. This approach is a specific example of the mod-n/div-n approach disclosed in the '532 patent in order to achieve an efficient mapping of physical memory addresses to physical memory locations. Other dimensions are masked off and may be handling using standard techniques within power-of-two routing circuit 830.

Embodiments in which memory interface circuit 120 includes multiple ones of provisioning circuits 550, 650, 750, 850, etc. are explicitly contemplated. One particular implementation might include provisioning circuits configured to perform each of the four provisioning types explicitly disclosed herein. While four provisioning types have been described above, these are merely exemplary. Additional provisioning operations and corresponding provisioning circuits can be included within designs as needed. More than a pair of elements might be able to be provisioned in one provisioning operation. In another provisioning operation, two dimensions could be provisioned at once (e.g., a particular memory controller and a pair of memory channels belonging to a different memory controller).

Even further, the teachings of the present disclosure, while described above with reference to a memory subsystem, are equally applicable to any set of computer resources that are organized in a hierarchy having multiple dimensions.

Accordingly, an apparatus comprising a computer system that includes a set of resources arranged according to a hierarchy that includes a plurality of dimensions including a first dimension with m routing options and a second dimension with n routing options. These "resources" are understood to be physical structures (circuits) within the computer system, and can include memory locations as described herein. The resources can also be devices (again, circuitry) that are "downstream" from memory, in that they inherit the modularity that the disclosed paradigm provides to the memory to which they are associated. The computer system further includes a resource interface circuit with a plurality of provisioning circuits. The provisioning circuits include a first provisioning circuit configured to perform a first provisioning operation that excludes access to a first portion of the set of resources, and a second provisioning circuit configured to perform a second provisioning operation that excludes access to a second portion of the set of resources.

The resource interface circuit is configured to receive a request to access the set of resources and route, based on provisioning information received by the resource interface circuit, the request to a particular provisioning circuit of the plurality of provisioning circuits. Still further, the resource interface circuit is configured to output, from the particular provisioning circuit, a set of selection signals that are usable to access some, but not all, elements in one of the plurality of dimensions in order to fulfill the request.

The computer system may further include a set of provisioning storage circuits that store the provisioning information, where the provisioning information includes 1) an indication of the particular provisioning circuit and 2) an indication of which elements are to be excluded from a dimension that is provisioned by the particular provisioning circuit.

In some embodiments, the plurality of provisioning circuits are configured to perform respective operations of the form ((y mod (C−1))+z) mod C, wherein C indicates a total number of elements in a respective dimension being provisioned, y is a portion of an address included in the request that corresponds to the respective dimension, and z is an offset value included in the provisioning information indicating which of a plurality of elements in the respective dimension are to be unused.

In one scenario, the first provisioning circuit is configured to cause one or more of the m routing options to be unavailable for the first dimension, and the second provisioning circuit is configured to cause one or more of the n routing options to be unavailable for the second dimension.

In another scenario, the first provisioning circuit is configured to cause a single one of the m routing options to be unavailable for the first dimension, and the second provisioning circuit is configured to cause a pair of the m routing options to be unavailable for the first dimension.

As noted, in one embodiment, the set of resources are memory locations in a memory subsystem of the computer system. In such a case, the plurality of dimensions may include one or more of the following dimensions: memory controller dimension, memory channel dimension, row dimension, bank dimension, column dimension.

Figure 9:
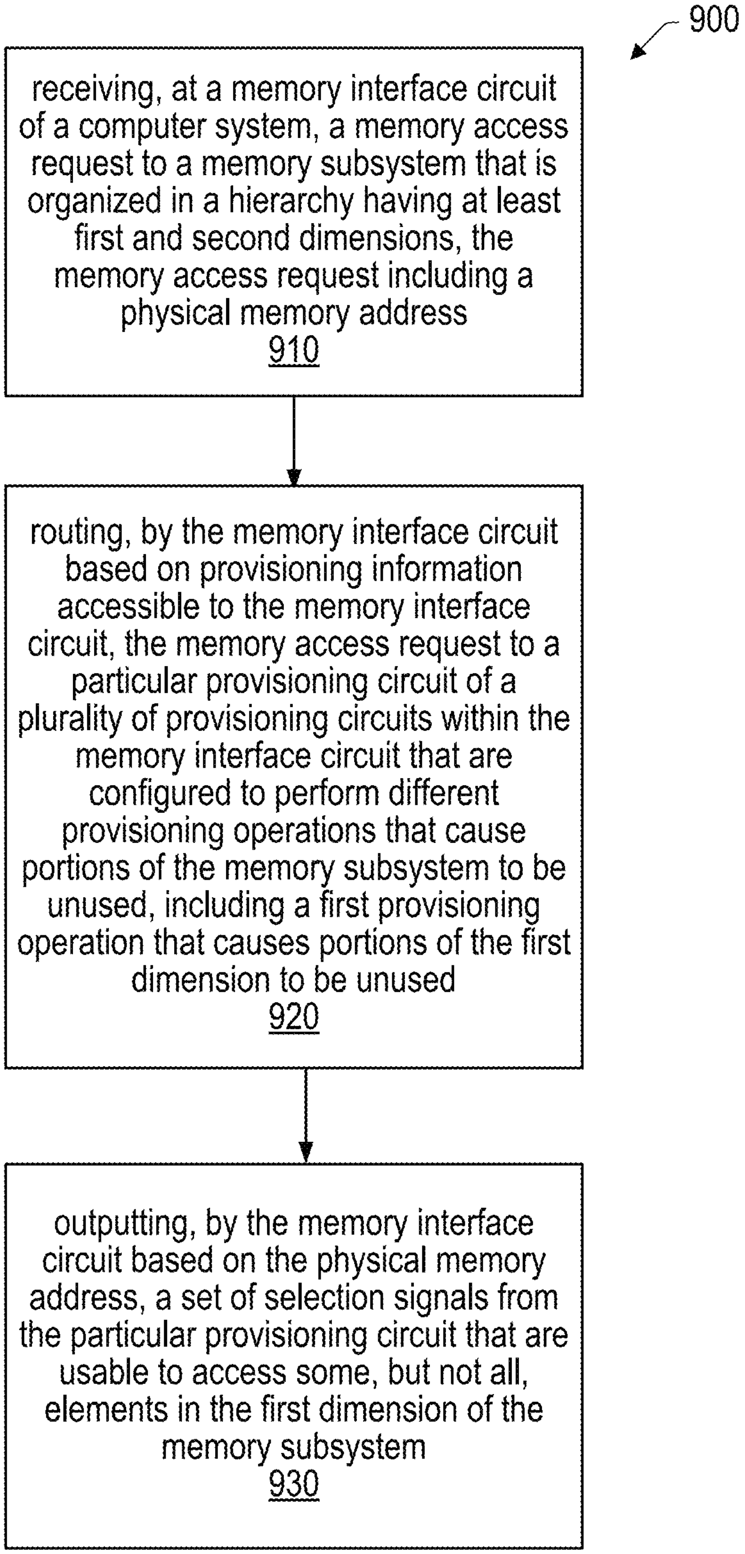
FIG. 9 is a flow diagram of one embodiment of a method for provisioning portions of a memory subsystem.

FIG. 9 is a flow diagram of one embodiment of a method 900 for provisioning memory within a computer system. Method 900 is written from the perspective of a memory interface circuit of a computer system, such as a system memory controller. Exemplary reference numerals to previously described structure and elements is provided for convenience in the following description of method 900. Such reference numerals, however, are not intended to unduly limit the scope of this method.

Method 900 begin in 910, in which a memory interface circuit (120) of a computer system (100) receives a memory access request (104) to a memory subsystem (110) that is organized in a hierarchy having at least first and second dimensions (130, 135, respectively). The memory access request includes a physical memory address. In 920, the memory interface circuit routes, based on provisioning information (170) accessible to the memory interface circuit, the memory access request to a particular provisioning circuit (e.g., 150A) of a plurality of provisioning circuits (150) within the memory interface circuit that are configured to perform different provisioning operations that cause portions of the memory subsystem to be unused, including a first provisioning operation that causes portions of the first dimension to be unused. In some cases, the provisioning information includes a provisioning type value (204) specifying the particular provisioning circuit that is hard coded in the computer system.

In some embodiments, the plurality of provisioning circuits may be configured to perform respective operations of the form ((y mod (C−1))+z) mod C for a respective dimension being provisioned. In this context, C indicates a total number of elements in the respective dimension (e.g., C=8, where a single memory controller is being disabled). The value y is a portion of a physical memory address that corresponds to the respective dimension. Finally, z is an offset value that indicates which of a plurality of elements in the respective dimension are to be unused. In some implementations, C differs in at least some of the plurality of provisioning circuits.

Finally, in 930 the memory interface circuit outputs, based on the physical memory address, a set of selection signals (155) from the particular provisioning circuit that are usable to access some, but not all, elements in the first dimension of the memory subsystem. For example, the first dimension of the memory subsystem may include m memory controllers (130), and a first provisioning circuit may be configured to output a first set of selection signals that are usable to access some, but not all, of the m memory controllers (e.g., access memory associated with memory controllers 130B-D but not memory associated with memory controller 130A). Similarly, the second dimension of the memory subsystem may include n memory channels (135) coupled between the memory controllers (130) and system memory (DRAM 140). A second provisioning circuit may be configured to output a second set of selection signals that are usable to access some, but not all, of the n memory channels (e.g., access memory associated with memory channels 135B-H, but not memory associated with memory channel 135A).

Example Device

Figure 10:
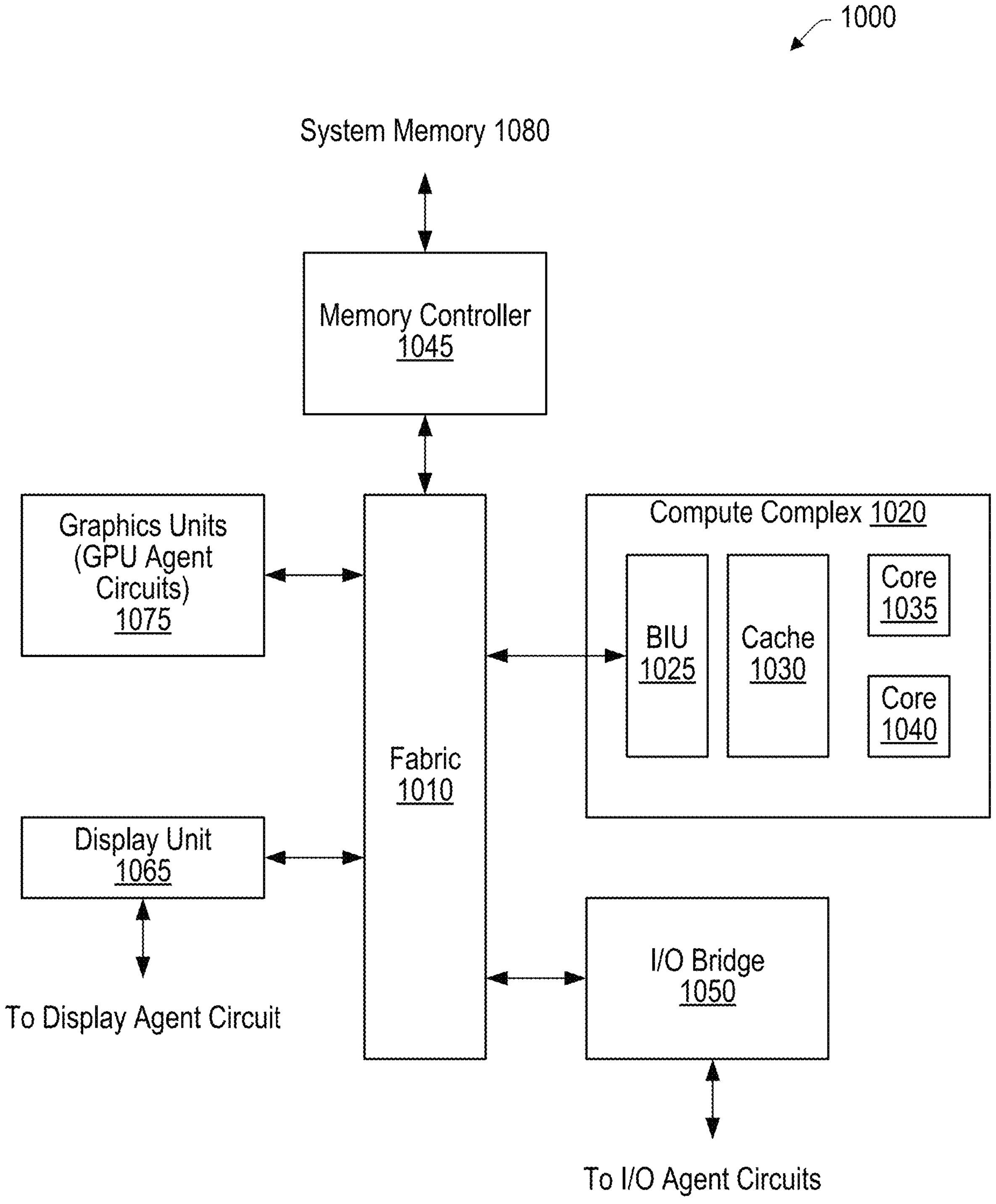
FIG. 10 is a block diagram of one embodiment of a device.

Referring now to FIG. 10, a block diagram illustrating an example embodiment of a device 1000 is shown. In some embodiments, elements of device 1000 may be included within a system on a chip, or in multiple integrated circuits as part of a chiplet architecture. In some embodiments, device 1000 may be included in a mobile device, which may be battery-powered. Therefore, power consumption by device 1000 may be an important design consideration. In the illustrated embodiment, device 1000 includes fabric 1010, compute complex 1020 input/output (I/O) bridge 1050, cache/memory controller 1045, graphics unit 1075, and display unit 1065. In some embodiments, device 1000 may include other components (not shown) in addition to or in place of the illustrated components, such as video processor encoders and decoders, image processing or recognition elements, computer vision elements, etc.

Fabric 1010 may include various interconnects, buses, MUX's, controllers, etc., and may be configured to facilitate communication between various elements of device 1000. In some embodiments, portions of fabric 1010 may be configured to implement various different communication protocols. In other embodiments, fabric 1010 may implement a single communication protocol and elements coupled to fabric 1010 may convert from the single communication protocol to other communication protocols internally.

In the illustrated embodiment, compute complex 1020 includes bus interface unit (BIU) 1025, cache 1030, and cores 1035 and 1040. In various embodiments, compute complex 1020 may include various numbers of processors, processor cores and caches. For example, compute complex 1020 may include 1, 2, or 4 processor cores, or any other suitable number. In one embodiment, cache 1030 is a set associative L2 cache. In some embodiments, cores 1035 and 1040 may include internal instruction and data caches. In some embodiments, a coherency unit (not shown) in fabric 1010, cache 1030, or elsewhere in device 1000 may be configured to maintain coherency between various caches of device 1000. BIU 1025 may be configured to manage communication between compute complex 1020 and other elements of device 1000. Processor cores such as cores 1035 and 1040 may be configured to execute instructions of a particular instruction set architecture (ISA) which may include operating system instructions and user application instructions. These instructions may be stored in computer readable medium such as a memory coupled to memory controller 1045 discussed below.

As used herein, the term "coupled to" may indicate one or more connections between elements, and a coupling may include intervening elements. For example, in FIG. 10, graphics unit 1075 may be described as "coupled to" a memory through fabric 1010 and cache/memory controller 1045. In contrast, in the illustrated embodiment of FIG. 10, graphics unit 1075 is "directly coupled" to fabric 1010 because there are no intervening elements.

Cache/memory controller 1045 may be configured to manage transfer of data between fabric 1010 and one or more caches and memories. For example, cache/memory controller 1045 may be coupled to an L3 cache, which may in turn be coupled to a system memory. In other embodiments, cache/memory controller 1045 may be directly coupled to a memory. In some embodiments, cache/memory controller 1045 may include one or more internal caches.

Memory interface circuit 120 may reside in memory controller circuit 1045 in some implementations.

System memory 1080 coupled to controller 1045 may be any type of volatile memory, such as dynamic random access memory (DRAM such as DRAM 140 included in FIGS. 1A-B), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 1045 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 1020 to cause the computing device to perform functionality described herein.

Graphics unit 1075 may include one or more processors, e.g., one or more graphics processing units (GPUs). Graphics unit 1075 may receive graphics-oriented instructions, such as OPENGL®, Metal®, or DIRECT3D® instructions, for example. Graphics unit 1075 may execute specialized GPU instructions or perform other operations based on the received graphics-oriented instructions. Graphics unit 1075 may generally be configured to process large blocks of data in parallel and may build images in a frame buffer for output to a display, which may be included in the device or may be a separate device. Graphics unit 1075 may include transform, lighting, triangle, and rendering engines in one or more graphics processing pipelines. Graphics unit 1075 may output pixel information for display images. Graphics unit 1075, in various embodiments, may include programmable shader circuitry which may include highly parallel execution cores configured to execute graphics programs, which may include pixel tasks, vertex tasks, and compute tasks (which may or may not be graphics-related).

Display unit 1065 may be configured to read data from a frame buffer and provide a stream of pixel values for display. Display unit 1065 may be configured as a display pipeline in some embodiments.

Additionally, display unit 1065 may be configured to blend multiple frames to produce an output frame. Further, display unit 1065 may include one or more interfaces (e.g., MIPI® or embedded display port (eDP)) for coupling to a user display (e.g., a touchscreen or an external display).

I/O bridge 1050 may include various elements configured to implement: universal serial bus (USB) communications, security, audio, and low-power always-on functionality, for example. I/O bridge 1050 may also include interfaces such as pulse-width modulation (PWM), general-purpose input/output (GPIO), serial peripheral interface (SPI), and inter-integrated circuit (I2C), for example. Various types of peripherals and devices may be coupled to device 1000 via I/O bridge 1050.

In some embodiments, device 1000 includes network interface circuitry (not explicitly shown), which may be connected to fabric 1010 or I/O bridge 1050. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 1000 with connectivity to various types of other devices and networks.

Example Applications

Figure 11:
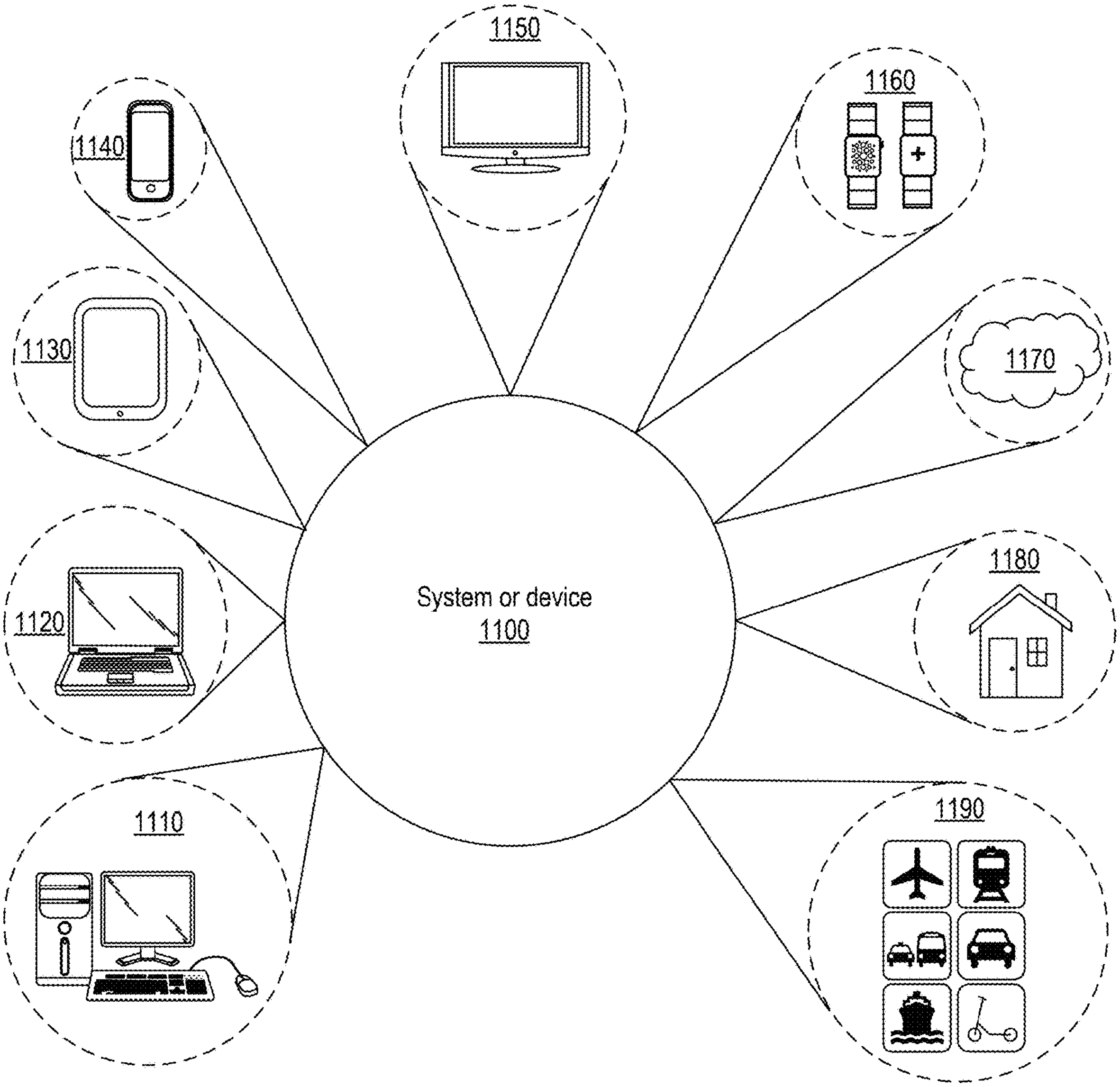
FIG. 11 is a diagram illustrating example applications for systems and devices employing the disclosed techniques.

Turning now to FIG. 11, various types of systems that may include any of the circuits, devices, or system discussed above. System or device 1100, which may incorporate or otherwise utilize one or more of the techniques described herein, may be utilized in a wide range of areas. For example, system or device 1100 may be utilized as part of the hardware of systems such as a desktop computer 1110, laptop computer 1120, tablet computer 1130, cellular or mobile phone 1140, or television 1150 (or set-top box coupled to a television).

Similarly, disclosed elements may be utilized in a wearable device 1160, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1100 may also be used in various other contexts. For example, system or device 1100 may be utilized in the context of a server computer system, such as a dedicated server or on shared hardware that implements a cloud-based service 1170. Still further, system or device 1100 may be implemented in a wide range of specialized everyday devices, including devices 1180 commonly found in the home such as refrigerators, thermostats, security cameras, etc. The interconnection of such devices is often referred to as the "Internet of Things" (IoT). Elements may also be implemented in various modes of transportation. For example, system or device 1100 could be employed in the control systems, guidance systems, entertainment systems, etc. of various types of vehicles 1190.

The applications illustrated in FIG. 11 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry.

Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 12:
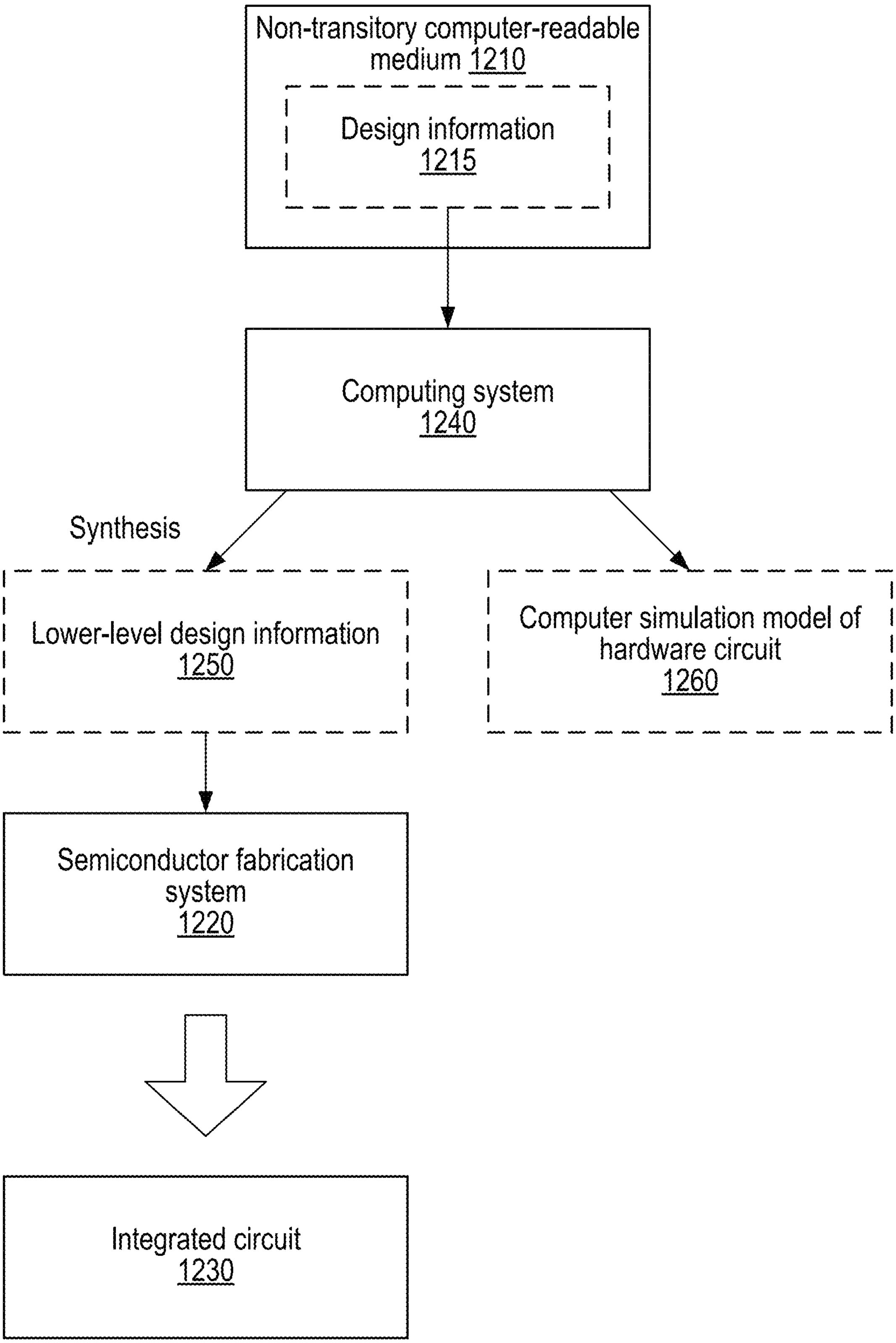
FIG. 12 is a block diagram illustrating an example computer-readable medium that stores circuit design information for implementing devices that employ the disclosed techniques.

FIG. 12 is a block diagram illustrating an example non-transitory computer-readable storage medium that stores circuit design information, according to some embodiments. In the illustrated embodiment, computing system 1240 is configured to process the design information.

This may include executing instructions included in the design information, interpreting instructions included in the design information, compiling, transforming, or otherwise updating the design information, etc. Therefore, the design information controls computing system 1240 (e.g., by programming computing system 1240) to perform various operations discussed below, in some embodiments.

In the illustrated example, computing system 1240 processes the design information to generate both a computer simulation model of a hardware circuit 1260 and lower-level design information 1250. In other embodiments, computing system 1240 may generate only one of these outputs, may generate other outputs based on the design information, or both. Regarding the computing simulation, computing system 1240 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 1240 also processes the design information to generate lower-level design information 1250 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 1250 (potentially among other inputs), semiconductor fabrication system 1220 is configured to fabricate an integrated circuit 1230 (which may correspond to functionality of the simulation model 1260). Note that computing system 1240 may generate different simulation models based on design information at various levels of description, including information 1250, 1215, and so on. The data representing design information 1250 and model 1260 may be stored on medium 1210 or on one or more other media.

In some embodiments, the lower-level design information 1250 controls (e.g., programs) the semiconductor fabrication system 1220 to fabricate the integrated circuit 1230. Thus, when processed by the fabrication system, the design information may program the fabrication system to fabricate a circuit that includes various circuitry disclosed herein.

Non-transitory computer-readable storage medium 1210, may comprise any of various appropriate types of memory devices or storage devices. Non-transitory computer-readable storage medium 1210 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1210 may include other types of non-transitory memory as well or combinations thereof. Accordingly, non-transitory computer-readable storage medium 1210 may include two or more memory media; such media may reside in different locations—for example, in different computer systems that are connected over a network.

Design information 1215 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 1240, semiconductor fabrication system 1220, or both. In some embodiments, design information may also include one or more cell libraries that specify the synthesis, layout, or both of integrated circuit 1230. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 1230 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 1220 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1220 may also be configured to perform various testing of fabricated circuits for correct operation.

In various embodiments, integrated circuit 1230 and model 1260 are configured to operate according to a circuit design specified by design information 1215, which may include performing any of the functionality described herein. For example, integrated circuit 1230 may include any of the provisioning circuits (e.g., 150, 550, 650, 750, 850) described herein. Further, integrated circuit 1230 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 1220 to fabricate integrated circuit 1230.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation-[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112 (f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:

a set of storage circuits configured to store provisioning information for a memory subsystem of a computer system, wherein the memory subsystem is organized according to a hierarchy having at least a first dimension and a second dimension, wherein the provisioning information specifies one of a plurality of provisioning operations that cause portions of the memory subsystem to be unused; and a memory interface circuit that includes:

a first provisioning circuit configured to perform a first provisioning operation to exclude memory access requests from being routed to a specified one of m memory controllers in the first dimension of the memory subsystem; and a second provisioning circuit configured to perform a second provisioning operation;

wherein the memory interface circuit is configured to:

receive a memory access request that includes a physical memory address; and output, based on the physical memory address and on the provisioning information indicating the first provisioning operation, a first set of selection signals from the first provisioning circuit that are usable to access some, but not all, elements in the first dimension of the memory subsystem to fulfill the memory access request.

2. The apparatus of claim 1, wherein the first provisioning circuit includes a first arithmetic circuit configured to use results of first mod-($C_1$−1) and mod-$C_1$ operations to generate the first set of selection signals, wherein $C_1$ specifies a total number of elements in the first dimension; and wherein the second provisioning circuit includes a second arithmetic circuit configured to use results of second mod-($C_2$−1) and mod-$C_2$ operations to generate a second set of selection values usable to access some, but not all, elements in the second dimension of the memory subsystem, wherein $C_2$ specifies a total number of elements in the second dimension and is different from $C_1$.

3. The apparatus of claim 1, wherein the first and second provisioning circuits are configured to exclude elements in dimensions of the memory subsystem for a particular physical memory address of a given memory access request by performing respective operations of the form $((y \bmod (C-1))+z) \bmod C$, wherein C indicates a total number of elements in a respective dimension being provisioned, y is a portion of the particular physical memory address corresponding to the respective dimension, and z is an offset value included in the provisioning information indicating which of a plurality of elements in the respective dimension are to be unused.

4. The apparatus of claim 1, wherein the computer system is located on one or more co-packaged integrated circuit dies, and wherein the provisioning information is hard coded into the set of storage circuits.

5. The apparatus of claim 1, wherein the provisioning information also specifies 1) a set of masks for determining a portion (y) of the physical memory address corresponding to a particular dimension to be provisioned, and 2) an offset value (z) indicating which elements within the particular dimension are to be unused.

6. The apparatus of claim 1, wherein the first dimension of the memory subsystem includes m memory controllers, and wherein the second dimension includes n memory channels located between the m memory controllers and volatile memory.

7. The apparatus of claim 1, wherein the second provisioning circuit is configured to perform the second provisioning operation to exclude memory access requests from being routed to a pair of the m memory controllers in the first dimension of the memory subsystem.

8. The apparatus of claim 1, wherein the second provisioning circuit is configured to perform the second provisioning operation to exclude memory access requests from being routed to a specified one of n memory channels in the second dimension of the memory subsystem.

9. The apparatus of claim 1, wherein the second provisioning circuit is configured to perform the second provisioning operation to exclude memory access requests from being routed to a pair of n memory channels in the second dimension of the memory subsystem.

10. The apparatus of claim 1, wherein the first provisioning circuit and the second provisioning circuit are configured to provision different numbers of elements from the first dimension of the memory subsystem.

11. The apparatus of claim 1, wherein the first provisioning circuit is configured to provision the first dimension of the memory subsystem, and wherein the second provisioning circuit is configured to provision the second dimension of the memory subsystem.

12. A method, comprising:

receiving, at a memory interface circuit of a computer system, a memory access request to a memory subsystem that is organized in a hierarchy having at least first and second dimensions, the memory access request including a physical memory address, wherein the first dimension of the memory subsystem includes m memory controllers;

routing, by the memory interface circuit based on provisioning information accessible to the memory interface circuit, the memory access request to a particular provisioning circuit of a plurality of provisioning circuits within the memory interface circuit that are configured to perform different provisioning operations that cause portions of the memory subsystem to be unused, including a first provisioning operation that causes portions of the first dimension to be unused; and outputting, by the memory interface circuit based on the physical memory address, a set of selection signals from the particular provisioning circuit that are usable to access some, but not all, of the m memory controllers in the first dimension of the memory subsystem.

13. The method of claim 12, wherein the provisioning information includes a provisioning type value specifying the particular provisioning circuit that is hard coded in the computer system.

14. The method of claim 12, wherein the provisioning information includes 1) a set of masks for determining a portion (y) of the physical memory address corresponding to a particular dimension to be provisioned, and 2) an offset value (z) indicating which elements within the particular dimension are to be unused.

15. The method of claim 12, wherein the second dimension of the memory subsystem includes n memory channels coupled between the m memory controllers and system memory, and wherein a second provisioning circuit is configured to output a second set of selection signals that are usable to access some, but not all, of the n memory channels.

16. The method of claim 12, wherein the plurality of provisioning circuits are configured to perform respective operations of the form ((y mod (C−1))+z) mod C, wherein C indicates a total number of elements in a respective dimension being provisioned, y is a portion of the physical memory address that corresponds to the respective dimension, and z is an offset value included in the provisioning information indicating which of a plurality of elements in the respective dimension are to be unused, and wherein C differs in at least some of the plurality of provisioning circuits.

17. A computer system, comprising:

a set of circuit resources arranged according to a hierarchy that includes a plurality of dimensions including a first dimension with m routing options and a second dimension with n routing options; and a resource interface circuit with a plurality of provisioning circuits that include:

a first provisioning circuit configured to perform a first provisioning operation that excludes access to a first portion of the set of circuit resources, wherein the first provisioning circuit includes a first arithmetic circuit configured to use results of first mod-($C_1$−1) and mod-C1 operations to generate a first set of routing signals, wherein C1 specifies a total number of routing options in the first dimension;

a second provisioning circuit configured to perform a second provisioning operation that excludes access to a second portion of the set of circuit resources, wherein the second provisioning circuit includes a second arithmetic circuit configured to use results of second mod-(C2−1) and mod-C2 operations to generate a second set of routing signals usable to access some, but not all, routing options in the second dimension of the hierarchy, wherein C2 specifies a total number of routing options in the second dimension and is different from C1;

wherein the resource interface circuit is configured to:

receive a request to access the set of circuit resources;

route, based on provisioning information received by the resource interface circuit, the request to a particular provisioning circuit of the plurality of provisioning circuits; and output, from the particular provisioning circuit, a set of selection signals that are usable to access some, but not all, elements in one of the plurality of dimensions in order to fulfill the request.

18. The computer system of claim 17, wherein the plurality of provisioning circuits are configured to perform respective operations of the form ((y mod (C−1))+z) mod C, wherein C indicates a total number of elements in a respective dimension being provisioned, y is a portion of an address included in the request that corresponds to the respective dimension, and z is an offset value included in the provisioning information indicating which of a plurality of elements in the respective dimension are to be unused.

19. The computer system of claim 17, wherein the set of resources are memory locations in a memory subsystem of the computer system.

20. An apparatus, comprising:

a set of storage circuits configured to store provisioning information for a memory subsystem of a computer system, wherein the memory subsystem is organized according to a hierarchy having at least a first dimension and a second dimension, wherein the provisioning information specifies 1) a set of masks for determining a portion (y) of a physical memory address corresponding to a particular dimension to be provisioned, and 2) an offset value (z) indicating which elements within the particular dimension are to be unused; and a memory interface circuit that includes:

a first provisioning circuit configured to perform a first provisioning operation; and a second provisioning circuit configured to perform a second provisioning operation;

wherein the memory interface circuit is configured to:

receive a memory access request that includes a particular physical memory address; and output, based on the particular physical memory address and on the provisioning information indicating the first provisioning operation, a first set of selection signals from the first provisioning circuit that are usable to access some, but not all, elements in the first dimension of the memory subsystem to fulfill the memory access request.

* * * * *